(12) United States Patent
Bakardzhiev

(10) Patent No.: US 11,372,640 B1
(45) Date of Patent: Jun. 28, 2022

(54) GENERATING EFFICIENCY METRICS FOR KNOWLEDGE WORKERS

(71) Applicant: FOUNDATION MODERN MANAGEMENT INSTITUTE, Sofia (BG)

(72) Inventor: Dimitar Venelinov Bakardzhiev, Sofia (BG)

(73) Assignee: Foundation Modern Management Institute, Sofia (BG)

( * ) Notice: Subject to any disclaimer, the term of this patent is extended or adjusted under 35 U.S.C. 154(b) by 0 days.

(21) Appl. No.: 17/557,228

(22) Filed: Dec. 21, 2021

(30) Foreign Application Priority Data

Nov. 2, 2021 (EP) .................................. 21472010

(51) Int. Cl.
   *G06F 8/71* (2018.01)
   *G06N 5/02* (2006.01)
   *G06F 11/34* (2006.01)

(52) U.S. Cl.
   CPC ............ *G06F 8/71* (2013.01); *G06F 11/3438* (2013.01); *G06N 5/025* (2013.01)

(58) Field of Classification Search
   CPC ........ G06F 8/71; G06F 11/3438; G06N 5/025
   USPC ....................................................... 717/121
   See application file for complete search history.

(56) References Cited

U.S. PATENT DOCUMENTS

| | | | |
|---|---|---|---|
| 9,639,352 B1 | 5/2017 | van Schaik et al. | |
| 9,639,353 B1 | 5/2017 | Henriksen et al. | |
| 10,310,853 B2 | 6/2019 | Wright | |
| 10,346,294 B2 | 7/2019 | van Schaik | |
| 10,423,594 B2 | 9/2019 | Olivier et al. | |
| 10,467,004 B2 | 11/2019 | Neathenway | |
| 10,768,925 B2 | 9/2020 | Avgustinov | |
| 10,810,009 B2 | 10/2020 | van Schaik | |
| 10,860,314 B2 | 12/2020 | Wright et al. | |
| 10,915,316 B1 | 2/2021 | Turner et al. | |
| 2005/0183143 A1* | 8/2005 | Anderholm ......... | G06F 11/3438 726/22 |
| 2013/0096968 A1 | 4/2013 | Van Let et al. | |

(Continued)

OTHER PUBLICATIONS

Meneely et al., "Improving Developer Activity Metrics with Issue Tracking Annotations". 2010, [Online], pp. 75-81, [Retrieved from internet on May 4, 2022], <https://dl.acm.org/doi/pdf/10.1145/1809223.1809234> (Year: 2010).*

(Continued)

*Primary Examiner* — S. Sough
*Assistant Examiner* — Zengpu Wei
(74) *Attorney, Agent, or Firm* — Caseiro Burke LLC; Chris A. Caseiro

(57) ABSTRACT

Methods, systems, and computer program products comprising computer readable instructions for generating efficiency metrics for knowledge workers. Data for symbol contributions of a knowledge worker is used for calculating Knowledge Discovery Efficiency (KEDE), which is a ratio between the symbol contributions of the knowledge worker for a time period indicated by a time aggregation type and a predetermined constant representing an estimated maximum amount of symbol contributions that can be contributed for the time period indicated by the time aggregation type. Templates and fraudulent values of the contributions are excluded from the calculation.

30 Claims, 15 Drawing Sheets

(56) References Cited

U.S. PATENT DOCUMENTS

2021/0263728 A1\* 8/2021 Farrier ............... G06Q 10/0635
2022/0122025 A1\* 4/2022 Amit ........................ G06F 8/77

OTHER PUBLICATIONS

Extended European Search Report for priority European application No. 21472010.4, dated Apr. 21, 2022, 13 pp.

\* cited by examiner

GENERATING EFFICIENCY METRICS FOR KNOWLEDGE WORKERS

TECHNICAL FIELD

The following description relates to measuring productivity of knowledge workers.

BACKGROUND

At present, there are many opinions about how the productivity of knowledge workers may be measured, but no single approach is accepted as standard, because knowledge by itself is invisible.

According to the Information theory, "knowledge" is when we know with certainty, it means 100% probability, that one out of many possibilities happened. We arrive at, gain, or discover knowledge by asking binary questions, which are questions with "Yes" or "No" answer. If an answer to a binary question allows to exclude some of the possibilities, then some "information" is acquired. If the question allows excluding 50% of the possibilities, it is considered that 1 bit of information is acquired.

"Missing information" (H) is the average number of binary questions needed to ask in order to gain the knowledge. Using the Shannon's formula, the amount of missing information H can be expressed in terms of the distribution of probabilities:

$$H(p_1, p_2, \ldots, p_n) = -K \sum_{i=1}^{n} p_i \log_2 p_i$$

where n is the number of possibilities, p is the probability for each possibility i. K is some positive constant and we will always take K=1.

In general, if there are n equally probable possibilities, the average number of questions needed to find which possibility has happened is:

$$H\left(\frac{1}{n}\right) = \log_2 n$$

In the case when there are n equally probable possibilities, and the number of questions asked is known, the number of possibilities can be calculated:

$$n = 2^H$$

The number of possibilities is called "perplexity" in the Information theory.

A knowledge discovery process comprises of asking questions in order to gain the missing information H about "What" to do and "How" to do it. For example, software development is a process of going from 0% knowledge about an idea to 100% knowledge of a finished product ready for delivery to a customer. Hence, the software development process can be modelled as a knowledge discovery process.

Knowledge workers are those who need to discover knowledge, via acquiring missing information, in order to produce tangible output.

In many cases, the output is in the form of textual content typed using a computer keyboard and stored in files. One example of textual content can be a contract prepared by a lawyer. Another example can be computer software source code.

In many organizations, the textual content they produce is maintained by special software programs called content management systems. Most of the present-day content management systems use versioning. Versioning creates a historical record of all changes, stamped with date/time and indication of the user who made the change on a per-file basis. The end user can view, delete, and restore a version. For example, Microsoft® SharePoint Library has the ability to store, track, and restore the previous state of the document, as it was before a user changed it.

In the specific kind of knowledge work, which is software development, versioning of source code is also a generally accepted practice.

In version control systems, a repository is a data structure that stores metadata for a set of files or a directory structure. It could be located on a hard disk drive, a virtual storage etc.

Source code is typically maintained by developers in a repository of source code using a version control system. In case the version control system is distributed, e.g., Git®, then there are local and remote repositories. A remote repository in Git® is a common repository that allows software developers to exchange their source code changes. In most cases, such a remote repository is stored on a hosting service like GitHub® or on an internal server.

Version control systems generally maintain multiple revisions of the source code in the repositories, each revision being referred to as a snapshot. Each snapshot includes the source code of files of the code base, as the files existed at a particular point in time, and each snapshot includes a timestamp to indicate when the files were committed to the version control system.

Relationships among snapshots stored in a version control system can be represented as a directed, acyclic revision graph. Each node in the revision graph represents a commit of the source code. Each commit represents a particular snapshot as well as other pertinent information about the snapshot, such as the author of the snapshot and data about ancestors of the commit in the revision graph. Each commit has a unique identifier. In case of Git®, such an identifier is called "commit hash". The "commit hash" is sometimes called a Git® commit "reference", "ref" or "SHA". It is generated by Git®. In a source control system like Git®, one can branch any commit and attach a chain of new commits to that branching point. A branch is a series of commits.

A directed edge from a first node to a second node in the revision graph indicates that a commit represented by the first node occurred before a commit represented by the second node, and that no intervening commits exist in the version control system. In such cases, the first node is a parent of the second node, and the second node is called a child.

Textual content can be analyzed. For example, when computer software source code is analyzed without executing the source code as a computer software program, this is called static analysis.

Typing speed has been subject to considerable research. One of the metrics used for analyzing typing speed is inter-key interval (IKI), which is the difference in timestamps between two keypress events. Some research that included 136,857,600 keystrokes from 168,960 participants, with on average about 810 keypresses per participant, found that the average IKI is 0.238 s (Ostry, D. J. (1983). *Deter-* minants of interkey times in typing. In W E. Cooper (Ed.), *Cognitive aspects of skilled typewriting* (pp. 225-246). *New York: Springer-Verlag*).

It is found that proficient typing is dependent on the ability to view characters in advance of the one currently being typed. The median TM was 0.101 s for typing with unlimited preview and for typing with 8 characters visible to the right of the to-be-typed character but was 0.446 s with only 1 character visible prior to each keystroke (Shaffer, L, H (1976). *Intention and performance. Psychological Review,* 83, 375-393.).

Another well-documented finding is that familiar, meaningful material is typed faster than unfamiliar, nonsense material (Shaffer, L. H (1973). *Latency mechanisms in transcription. In S. Kornblum (Ed.), Attention and performance IV* (pp. 435-446). *New York: Academic Press.*).

Another finding that may account for some of the IKI variability is what may be called the "word initiation effect". If words are stored in memory as integral units, one may expect the latency of the first keystroke in the word to reflect the time required to retrieve the word from memory (Ostry, D. J. (1980). *Execution-time movement control. In G. E. Stelmach & J. Requin (Eds.), Tutorials in motor behavior* (pp. 457-468). *Amsterdam: North-Holland.*).

There is a need to provide advanced systems and methods for measuring knowledge workers productivity. The problem is solved by the subject matter of the independent claims. Preferred embodiments are defined in the dependent claims.

SUMMARY

According to one aspect, a computer-implemented method for generating efficiency metrics for a knowledge worker is provided. The method includes:

obtaining data for symbol contributions of the knowledge worker, the symbol contributions occurring in commits by the knowledge worker to one or more files in a version-controlled repository, wherein the symbol contributions are symbols added to and deleted from the one or more files;

storing the obtained data for symbol contributions of the knowledge worker with a unique identifier of the version-controlled repository under a knowledge worker profile;

detecting and storing templates and fraudulent values in the obtained data for symbol contributions of the knowledge worker;

receiving a request to calculate knowledge discovery efficiency (KEDE) for the knowledge worker, wherein the request comprises a time aggregation type; and calculating KEDE for the knowledge worker and the time aggregation type, wherein KEDE is a ratio between the symbol contributions of the knowledge worker for a time period indicated by the time aggregation type, excluding the templates and fraudulent values, and a predetermined constant representing an estimated maximum amount of symbol contributions that can be contributed for the time period indicated by the time aggregation type.

In one embodiment, the method includes storing the calculated KEDE for the knowledge worker and the time aggregation type with the unique identifier of the version-controlled repository.

In one embodiment of the method, the knowledge worker is a software developer. In this embodiment, obtaining the data for symbol contributions of the knowledge worker includes:

receiving a request to analyze a local clone of the version-controlled repository, wherein the request comprises a name of a project the analyzed version-controlled repository to be assigned to, and a repository path leading to a directory where the analyzed repository is cloned;

extracting a list of commits from the local clone;

extracting author name and creation time for the list of commits;

extracting data representing one or more parent commits from the list of commits and one or more child commits from the list of commits, wherein each of the one or more parent commits is a parent commit to a child commit in a revision graph of the version-controlled repository, and wherein each commit includes source code of the one or more files of the version-controlled repository as the one or more files existed at a particular point in time;

for each pair of parent-child commits performing a diffing method producing one or more patches, wherein a patch from the one or more patches contains changes from an old state to a new state of a file from the one or more files of the version-controlled repository;

counting added and deleted symbols for each of the one or more patches;

detecting a computer language used for each of the one or more patches;

storing counts of added and deleted symbols for the list of commits; and storing counts of symbols per detected computer language for the list of commits.

In the embodiment, when the knowledge worker is a software developer, detecting and storing templates and fraudulent values in the obtained data for symbol contributions of the knowledge worker further includes:

receiving a request to find templates and fraudulent values for the software developer;

loading obtained data for symbol contributions per commit for the software developer;

finding commits of same code in different version-controlled repositories for the software developer at the same time;

finding commits for the software developer that have same commit identifier, wherein commits with same identifier appear in case that an existing repository is copied to a new directory under a new name;

finding commits with a total count of symbols changed exceeding the estimated maximum amount of symbol contributions that can be contributed for the time period indicated by the time aggregation type;

finding commits of code moved from one version-controlled repository to another on the same date;

finding commits of code moved from one version-controlled repository to another not on the same date;

finding commits, which are outliers using a method of Exponentially Weighted Moving Average Control Charts; and storing detected templates and fraudulent values for the found commits.

In one embodiment, the method further includes:

receiving a definition of a knowledge worker entity and a time aggregation type for the knowledge worker entity, wherein the knowledge worker entity comprises at least one knowledge worker;

extracting stored calculated KEDE for the time aggregation type for the at least one knowledge worker of the knowledge worker entity;

aggregating the extracted KEDE for the knowledge worker entity;

generating a KEDE model and computing KEDE attributes from the KEDE model using the aggregated KEDE for the knowledge worker entity; and providing a presentation of the KEDE model.

In one embodiment, the KEDE attributes are one or more selected from the group consisting of an average, a median, a confidence interval, and a percentile.

In one embodiment, the method further includes:

receiving a request to rank knowledge worker entities using the KEDE model; obtaining the requested KEDE model;

ranking the knowledge worker entities using the obtained KEDE model; and providing a presentation of the ranking.

According to another aspect of the invention, a computer program product comprising computer readable instructions is provided. The instructions, when loaded and executed on a suitable system perform the steps according to the methods described above.

According to another aspect of the invention, a computer system for generating efficiency metrics for a knowledge worker is provided. The system includes:

an analysis and attribution engine arranged to:

obtain data for symbol contributions of the knowledge worker, the symbol contributions occurring in commits by the knowledge worker to one or more files in a version-controlled repository, wherein the symbol contributions are symbols added to and deleted from the one or more files; and store the obtained data for symbol contributions of the knowledge worker with a unique identifier of the version-controlled repository under a knowledge worker profile;

a templates and fraud detection engine arranged to detect and store templates and fraudulent values in the obtained data for symbol contributions of the knowledge worker; and a KEDE calculation engine arranged to:

receive a request to calculate knowledge discovery efficiency (KEDE) for the knowledge worker, wherein the request comprises a time aggregation type; and calculate KEDE for the knowledge worker and the time aggregation type, wherein KEDE is a ratio between the symbol contributions of the knowledge worker for a time period indicated by the time aggregation type, excluding the templates and fraudulent values, and a predetermined constant representing an estimated maximum amount of symbol contributions that can be contributed for the time period indicated by the time aggregation type.

In one embodiment of the system, the KEDE calculation engine is further arranged to store the calculated KEDE for the knowledge worker and the time aggregation type with the unique identifier of the version-controlled repository.

In one embodiment of the system, the knowledge worker is a software developer. In this embodiment, the analysis and attribution engine is further arranged to:

receive a request to analyze a local clone of the version-controlled repository, wherein the request comprises a name of a project the analyzed version-controlled repository to be assigned to, and a repository path leading to a directory where the analyzed repository is cloned;

extract a list of commits from the local clone;

extract author name and creation time for the list of commits;

extract data representing one or more parent commits from the list of commits and one or more child commits from the list of commits, wherein each of the one or more parent commits is a parent commit to a child commit in a revision graph of the version-controlled repository, and wherein each commit includes source code of the one or more files of the version-controlled repository as the one or more files existed at a particular point in time;

for each pair of parent-child commits perform a diffing method producing one or more patches, wherein a patch from the one or more patches contains changes from an old state to a new state of a file from the one or more files of the version-controlled repository;

count added and deleted symbols for each of the one or more patches;

detect a computer language used for each of the one or more patches;

store counts of added and deleted symbols for the list of commits;

store counts of symbols per detected computer language for the list of commits.

In the embodiment, when the knowledge worker is a software developer, the templates and fraud detection engine is further arranged to:

receive a request to find templates and fraudulent values for the software developer;

load obtained data for symbol contributions per commit for the software developer;

find commits of same code in different version-controlled repositories for the software developer at the same time;

find commits for the software developer that have same commit identifier, wherein commits with same identifier appear in case that an existing repository is copied to a new directory under a new name;

find commits with a total count of symbols changed exceeding the estimated maximum amount of symbol contributions that can be contributed for the time period indicated by the time aggregation type;

find commits of code moved from one version-controlled repository to another on the same date;

find commits of code moved from one version-controlled repository to another not on the same date;

find commits, which are outliers using a method of Exponentially Weighted Moving Average Control Charts; and store the detected templates and fraudulent values for the found commits.

In one embodiment, the system further includes:

a modeling engine arranged to:

receive a definition of a knowledge worker entity and a time aggregation type for the knowledge worker entity, wherein the knowledge worker entity comprises at least one knowledge worker;

extract stored calculated KEDE for the time aggregation type for the at least one knowledge worker of the knowledge worker entity;

aggregate the extracted KEDE for the knowledge worker entity;

generate a KEDE model and compute KEDE attributes from the KEDE model using the aggregated KEDE for the knowledge worker entity; and a presentation engine arranged to provide a presentation of the KEDE model.

In one embodiment, the KEDE attributes are one or more selected from the group consisting of an average, a median, a confidence interval, and a percentile.

In one embodiment of the system, the modeling engine is further arranged to:

receive a request to rank knowledge worker entities using the KEDE model;

obtain the requested KEDE model; and rank the knowledge worker entities using the obtained KEDE model; and the presentation engine is further arranged to provide a presentation of the ranking.

DETAILED DESCRIPTION

Figure 1:
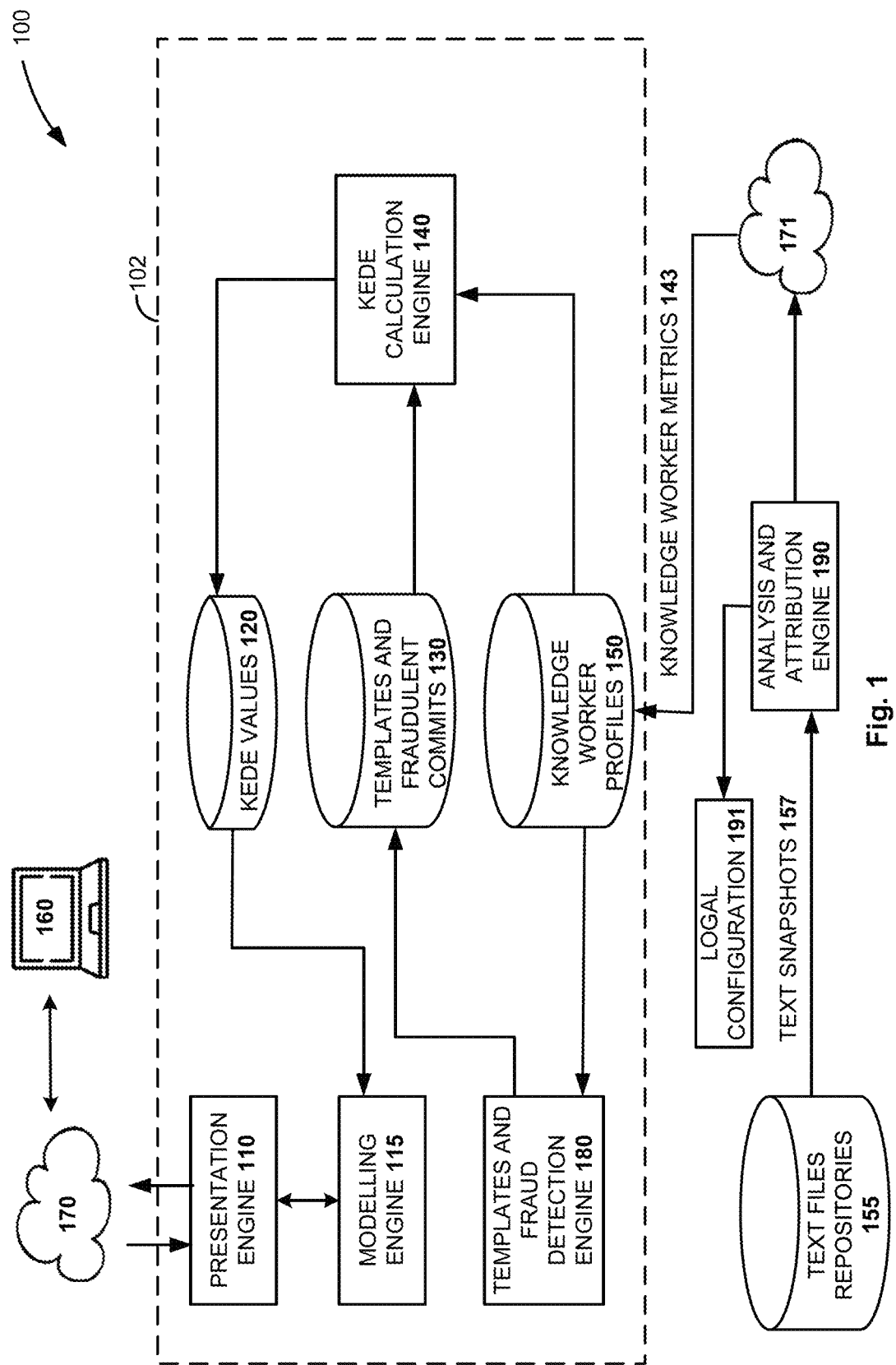
FIG. 1 is a block diagram of a system for generating efficiency metrics for a knowledge worker.

This specification describes how a system can compute the knowledge discovery efficiency (KEDE) of a particular knowledge worker entity achieved within a particular time period.

Each knowledge worker entity can be an individual knowledge worker, an arbitrarily selected group of knowledge workers, a team of knowledge workers in an organization, a group of knowledge workers who work on a particular project, the organization as a whole, or some other group of knowledge workers.

The KEDE calculation relates knowledge worker output in terms of amount of textual content contributed for a time period, excluding the templates and fraudulent text, to a predetermined constant that represents an estimated maximum amount of textual content that can be contributed for the same time period. The measure of the amount of textual content contributed is the count of the net symbols added to a text files repository in a time period, for example per minute, per hour, or per day.

Textual content can be any text file, which in order to be produced, a human being must type the symbols of the text on a keyboard. Text files are stored in a repository managed by a version control system To calculate KEDE, a system can collect knowledge worker activity metrics. Each activity metric can be an array that indicates: 1) a unique identifier; 2) the author name; 3) number of symbols added; 4) number of symbols deleted; 5) the timestamp of when the textual content is saved; 6) the time-zone offset; 7) the unique identifier of the repository the text was committed to.

For example, if the text files are stored in a Git® repository, then the unique identifier could be a 40-byte hashed object, the timestamp could be the time when the source code change was committed, and the unique identifier of the repository could be the remote origin of the source code repository.

A knowledge worker entity aims to discover knowledge with the least number of binary questions asked. The less questions asked, the more efficient a knowledge discovery process is and the greater the KEDE value is.

There is no way to capture the questions knowledge workers ask themselves and others while working. We have the output of their work in the form of a textual content contributed, for example in the form of computer source code.

We assume that when being at work, a knowledge worker is either typing symbols or asking questions what to type.

Thus, the total working time includes four components:
Time spent typing
Time spent asking questions about WHAT to work
Time spent asking questions about HOW to implement the WHAT
Time doing something else (NW)

We assume an ideal system where NW is zero.

Using the maximum number of symbols (including space and backspace), which could be typed by a human being per hour (CPH), the number of hours h spent typing and the number of symbols typed per hour S, the average number of questions asked H can be calculated as:

$$H = \frac{h \times CPH}{S} - 1$$

In order to use this formula in practice, it is necessary to know both S and CPH. The actual number of symbols typed S can be count by analyzing snapshots from version-controlled repositories. h=8 hours, because that is the standard length of a working day. For CPH the naturally constrained value of inter-key interval IKI=0.288 s is used. That makes CPH=12 500 symbols per hour or 100 000 symbols per eight hours of work.

Efficiency means the less questions asked per symbol the better. In other words, the more symbols typed per an 8-hour working day, the better. Hence, the formula can be rewritten to emphasize this:

$$\frac{S}{h \times CPH} = \frac{1}{1+H}$$

The left part of the equation is what can be measured in practice. To emphasize it, a new metric named KEDE is introduced. KEDE is an acronym for "KnowledgE Discovery Efficiency".

$$KEDE = \frac{S}{h \times CPH}$$

H is always positive but has no upper bound. KEDE is reciprocal of H and has a maximum value of 1 and minimum value of 0.

$$KEDE = \frac{1}{1+H}$$

We convert the KEDE formula into percentages and add a coefficient for wasted questions W:

$$KEDE = \frac{S \times (1-W)}{h \times CPH} \times 100\%$$

where W stands for:

$$W = \frac{D}{S}$$

D is the number of symbols deleted per hour, and S is the number of added symbols per hour.

KEDE allows a user to relate the manual work of typing with the knowledge work of thinking what to type. The physical part is visible, and the knowledge part is invisible.

KEDE being a measure of efficiency can be considered one aspect of knowledge worker productivity. In particular, the quality of the produced textual content, in terms of meeting its requirements is also an important aspect of productivity, which is not captured by KEDE. However, KEDE provides valuable insight into the activities and respective skills of knowledge worker entities in terms of the efficiency of knowledge discovery.

A knowledge work organization is considered a black box. Our aim is by using KEDE to understand how the knowledge discovery happens inside the organization. using only observable quantities from its output, which is textual content.

By acquiring a deeper understanding about how efficient the knowledge discovery process is, we can infer if there are constantly changing requirements, a mismatch between skills applied and the nature of the work requested, a broken communication with the requestor, etc.

As an example, an organization producing computer software can be considered and thus analyzed being an organization doing knowledge work.

The job of a knowledge worker encompasses a complex collection of activities that may occur at irregular intervals. Knowledge workers take vacations, have meetings, and ramp up on new projects. Thus, no knowledge worker entity has constant KEDE.

In order to capture such real-world complexity, a system can treat the knowledge discovery efficiency (KEDE) as a random variable. In particular, the system can model, for each knowledge worker entity, a range of possible KEDE values and predict the likeliness of any particular value within that range actually occurring.

As such, the system can represent the KEDE of a knowledge worker entity as a probability distribution generated by a KEDE model. For example, a KEDE model can assign a score that represents a likeliness that a knowledge worker's KEDE, at an arbitrary instance of time, will be equal to a particular value x.

Importantly, the probability distribution can be influenced both by the actions of a knowledge worker entity, but also by the actions of others. In other words, the probability distribution can consider how typical knowledge worker entities behave, as well as how the particular knowledge worker entity behaves. Doing so helps to account for low levels of data or noisy data.

Embodiments of the subject matter described in this specification can be implemented to realize one or more of the following advantages. Managers can use KEDE to help identifying the most valuable contributors in an empirical way. A KEDE model can provide an ability to estimate the productivity of knowledge worker entities, which takes into account the fact that knowledge workers perform many tasks other than directly changing textual content. A KEDE model can also provide the ability to estimate the productivity of knowledge worker entities that includes a measure of the uncertainty in the estimate, which helps decision makers to avoid conclusions not clearly supported by the data. A KEDE model can also provide the ability to rank knowledge worker entities.

KEDE models provide a means to track the change in KEDE values over time, which tends to be robust over sparse and noisy data. For example, in terms of the growth rate at which they change textual content or by constructing a time-series of knowledge worker entities measured over regular time intervals, for instance per week, per month, etc. This information can provide knowledge workers and management with valuable information about the relative intensity of the work effort at various lifecycle stages of a project, which can be used for staffing decisions in the future. These techniques provide a means to compare the activities of various projects in order to assess which projects are growing or declining in terms of knowledge discovery efficiency. This comparison can be helpful when deciding which technologies to use, which management approaches to adopt, what organizational changes to make. By tracking the change in KEDE values over a period of analysis, the intensity of work effort devoted to the project can be measured.

For example, in the application of KEDE analysis to software development, this provides significantly more useful information than simply counting the number of lines of code or the number of commits.

In addition, since KEDE is measured per time period, for example working hour, KEDE can be directly related to wage costs.

For example, the application of KEDE to software development would allow buyers of software engineering services to measure KEDE per unit of monetary cost, and thus compare the value-for-money of vendors of software engineering services in order to make better more informed purchasing decisions.

FIG. 1 is a block diagram of an example system 100 for generating efficiency metrics for a knowledge worker. The system 100 includes a User device 160 in communication with a Static analysis system 102 over a Network 170. The Static analysis system 102 is an example system that can be implemented as a distributed or cloud-based system for performing distributed static analysis for a single organization or across multiple organizations and for a single project or across multiple projects.

The Static analysis system 102 includes several components: a Presentation engine 110, a Modelling engine 115 a collection of calculated KEDE values 120, a collection of identified Templates and fraudulent commits 130, a collection of Knowledge worker profiles 150, a KEDE calculation engine 140, and a Templates and Fraud Detection Engine 180. The components of the Static analysis system 102 can be implemented as computer programs installed on one or more computers in one or more locations that are coupled to each other through a network. In a cloud-based system, these components can each be implemented by one or more individual computing nodes of a distributed computing system.

A user of User device 160 can use the Static analysis system 102 to obtain KEDE data for knowledge worker entities, which contribute textual content to version-controlled Text files repositories 155. Each of the Text files repositories 155 comprises one or more Text snapshots 157.

Knowledge worker metrics 143 are produced by an Analysis and Attribution Engine 190, and then sent to the Static analysis system 102 over network 171 and stored in Knowledge worker profiles 150. The network 171 may or may not be the same as the network 170. The Knowledge worker metrics 143 represent characteristics of knowledge worker actions, as represented by their contributions to the version-controlled Text files repositories 155. The collection of Knowledge worker profiles 150 associates each knowledge worker with one or more metrics corresponding to individual knowledge worker actions or relationships between knowledge worker actions for the Text files repositories 155. For example, the metrics can include added and deleted symbols.

The Knowledge worker profiles 150 can also include other information pertinent to the knowledge worker. For example, the Knowledge worker profiles 150 includes working time information, which is data representing how long each knowledge worker has worked during a particular time period. The working time information can be derived from a variety of sources including working schedules and calendar entries. The Static analysis system 102 would typically not include such information, nor would such information be located in the Text files repositories 155. Thus, a user of the User device 160 can provide such information to the Static analysis system 102 before or concurrently with requesting KEDE data. Alternatively, in the absence of working time information, the Static analysis system 102 can default to a typical working schedule for a knowledge worker, for example an eight-hour day occurring five days per week.

To generate the Knowledge worker metrics 143 and populate the collection of Knowledge worker profiles 150, the Static analysis system 102 can use an Analysis and attribution engine 190.

The Analysis and attribution engine 190 computes the Knowledge worker metrics 143, attributes changes in the text files between text snapshots 157 to a particular knowledge worker, and stores this data in the collection of Knowledge worker profiles 150 along with timestamps of when the text snapshots 157 were committed to the version-controlled Text files repositories 155.

In one embodiment, the Knowledge worker metrics 143 are referred to as efficiency metrics of a knowledge worker and the Analysis and attribution engine 190 obtains data for symbol contributions of the knowledge worker. The symbol contributions are occurring in commits by the knowledge worker to files in a version-controlled repository, such as Text files repositories 155. The symbol contributions are symbols added and deleted from the files. For example, the Analysis and attribution engine 190 can determine that between two text snapshots 157 of a particular repository, ten symbols were added and that the added symbols should be attributed to the knowledge worker that committed to the later of the two text snapshots 157. The Analysis and attribution engine 190 stores the obtained data for symbol contributions of the knowledge worker, together with a unique identifier of the version-controlled repository under a knowledge worker profile.

In one embodiment, the knowledge worker is a software developer. In this embodiment, the Text files repositories 155 can be implemented using Git® and they contain computer software source code.

Figure 5:
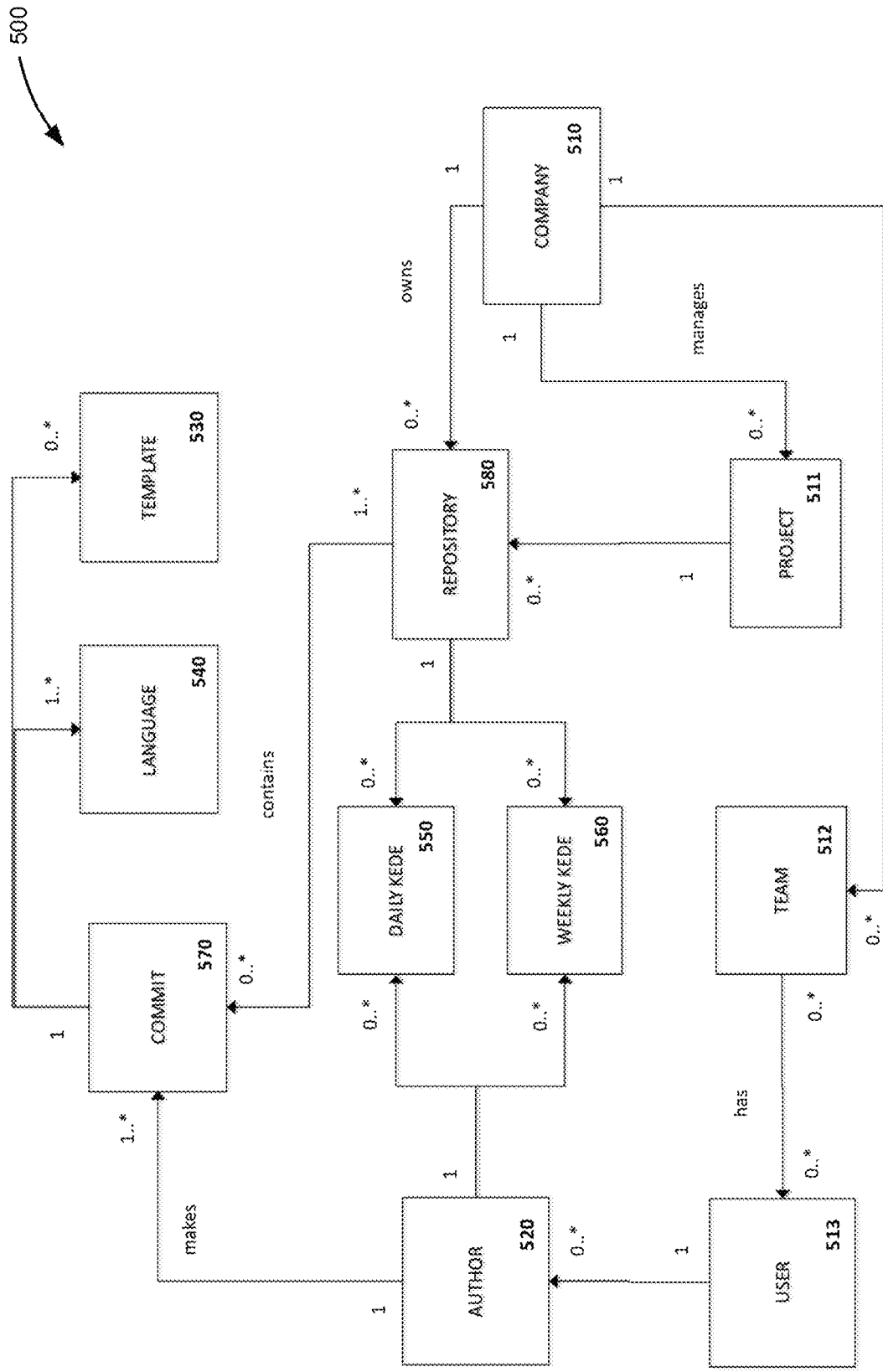
FIG. 5 represents an implementation of the collections of the static analysis system presented in FIG. 1, by means of database tables.

FIG. 5 represents an implementation of the collections of the static analysis system 102 by means of database tables when the knowledge worker entity is one or more software developers. The drawing 500 shows the names and the relations between database tables.

In this embodiment, the Analysis and attribution engine 190 receives a request to analyze a local clone of a version-controlled repository from the Text files repositories 155 and the request contains a name of a project the analyzed version-controlled repository is to be assigned to, and a repository path leading to a directory where the analyzed repository is cloned. The request can further include the earliest time (as a timestamp) after which commits to the repository will be analyzed, and a command word indicating the exact activity to be performed. For example, there is a command word for each of the use cases that the Analysis and attribution engine 190 can handle:

1. Analyze for the first time one or more local repositories cloned from one or more remote Git® origins. This will analyze all commits from the moment a repository was created onwards. The analyzed repositories are assigned to a new or to an existing project.

2. Update existing repositories assigned to a project. This would analyze only the newly created commits.

If the earliest commit time is provided in the request, then only commits made after it will be analyzed. In case the repository path contains several Git® repositories, the process described below will be executed for each of the repositories.

The Analysis and attribution engine 190 checks if an entry with the provided project name exists in table Project 511 (FIG. 5). If there is no project with the provided name, then the Analysis and attribution engine 190 will register a new project in table Project 511. In what follows, the project with the provided project name will be referred to as "the project".

The Analysis and attribution engine 190 extracts the remote origin from the Git® configuration in the provided repository path. The Analysis and attribution engine 190 checks if an entry with the provided remote origin exists in table Repository 580. If there is no entry with the remote origin, then the Analysis and attribution engine 190 registers a new entry in table Repository 580 using the origin and assigns the newly registered repository to the project. The Analysis and attribution engine 190 searches in table Repository 580 to find the latest analyzed commit for the repository.

The Analysis and attribution engine 190 executes a Git® "log" command to extract a list of all commits from the local clone, not only the current branch. An implementation of the command can be "git log—all—reverse—date-order format='% H'" That is a step to be used to ensure that all branches are analyzed.

After that, the Analysis and attribution engine 190 starts a loop over all of the listed commits and executes the steps below for each of the listed commits.

The Analysis and attribution engine 190 extracts the commit time of the commit and converts it to UTC timezone and checks if its commit time is before the provided earliest commit time. If that is the case, then the Analysis and attribution engine 190 will not analyze this commit.

The Analysis and attribution engine 190 extracts the author name of the commit. The Analysis and attribution engine 190 checks if there is an entry with the same name in table Author 520. If no entry is found, then the author name is stored in table Author 520.

The Analysis and attribution engine 190 extracts the parent commit of the commit in the revision graph of the version-controlled repository.

Using the commit and its parent commit the Analysis and attribution engine 190 runs Git® "diff" command with the "-p" option and produces patch text that contains one or more patches. Each patch contains changes from an old state to a new state of a file made by the commit.

The Analysis and attribution engine 190 starts a loop over all of the patches and for each patch the engine executes the following steps.

First, the Analysis and attribution engine 190 checks if the file type of the patch is one of the allowed file types described in the Local configuration 191. If not, then the Analysis and attribution engine 190 continues with the next patch.

The Analysis and attribution engine 190 counts the symbols added and symbols deleted for the current patch.

Then the Analysis and attribution engine 190 finds the programming language used in the file of the patch. That is possible, because each patch is for one file and file extension is based on the programming language used.

The Analysis and attribution engine 190 maintains a counter for the total number of symbols added and symbols deleted by the commit and a counter for each computer language used in the commit. Each processed patch can increase the counters.

When all the patches for the current commit are processed, the Analysis and attribution engine 190 stores in table Commit 570 the current commit data. The format of the data stored can be: 1) commit hash, which is the unique identifier generated by Git®; 2) the author name of the commit; 3) number of symbols added; 4) number of symbols deleted; 5) the timestamp of the commit; 6) the time-zone offset of the commit time; 7) the unique identifier of the parent commit; 8) the unique identifier of the repository the commit was committed to.

The Analysis and attribution engine 190 stores in Language 540 the count of the number of symbols added for each of the computer languages used in the commit. The format of the data stored can be: 1) commit hash, which is the unique identifier generated by Git®; 2) the name of the programming language; 3) number of symbols added.

Turning again to FIG. 1, the Templates & Fraud Detection Engine 180 can use the data from the collection of knowledge worker profiles 150 to find one or more commits that were made of text templates or text committed with the purpose to game the metrics and then can store the findings into the collection of Templates & Fraudulent commits 130.

Text templates are one or more text files, or pieces of text which are copied from some place and then added to a text file. In the context of office clerks, an example might be a Tax Return template. In the context of software development, a template could be a ready to use open-source framework.

Fraud is committed when one or more text files are added to a repository, or a piece of text is added to a text file with the sole purpose to game the knowledge worker metrics. In the context of software development, a fraud can be committed by adding dead code (unused classes and methods) to a source code file.

In one embodiment, the Templates & Fraud Detection Engine 180 is implemented for the case where the knowledge worker entity is one or more software developers, the Text files repositories 155 are implemented using Git® and they contain computer software source code.

The Templates & Fraud Detection Engine 180 receives a request to find templates and fraudulent values for a software developer. From table Commit 570 (FIG. 5) the Templates & Fraud Detection Engine 180 loads obtained data for symbol contributions per commit for the software developer. Then, the Templates & Fraud Detection Engine 180 applies several filters to find commits that are templates or fraud. If not filtered out, such commits can artificially increase the number of symbols attributed to the current software developer.

A first filter finds many commits of the same code done in many version-controlled repositories for the same software developer at the same time. This can happen when one commit is merged or cherry-picked (Git® functionality) into another version-controlled repository or the same version-controlled repository. Then the merged commit has a different commit identifier "ref" (hex sha), but the commit time is the same. Hence, the criterion for the filter is: if one software developer has made many commits at the same time (up to a second), then all these are considered commits as copies of one and the same code. That is why the filter keeps only one of such commits found and filters the others.

A second filter finds all the commits for the software developer that have the same commit identifier "ref" (hex sha). This could happen, for example, when an existing cloned repository is copied to a new directory under a new name. That is why the filter keeps only one of such commits found and filters the others.

A third filter finds commits with the total count of symbols changed exceeding the estimated maximum amount of symbol contributions that can be contributed for the time period indicated by the time aggregation type. In one embodiment, the time aggregation type can be one day and the maximum estimated amount can be no more than 100 000 symbols. The constant 100 000 is not arbitrarily picked but comes from the KEDE formula. The filter finds the total number of net symbols added per date for the current software developer. The dates with total net symbols count of more than 100 000 are then processed one by one, so that for each date the commits that make the count of 100 000 are found. There are several possibilities, which could have happened. The first one is when for the current date there is one commit with more than 100 000 net symbols added or deleted. The second one is when there are many commits, each with a count less than 100 000, but when added up, the total is more than 100 000. In this case the filter will keep only those commits that make the total count less than 100 000 symbols net added.

A forth filter finds commits of code moved from one version-controlled repository to another on the same date. A benign reason for such an action could be that the software developer decided to change the repository where a particular functionality is stored. For instance, to move a source code library from a repository where it is used to a separate repository only for libraries. Then, there will be two commits with the same counts of symbols added and deleted—one for removing the code from its current repository and one for adding it to the new repository. Both activities take place on the same day, but not at the same time of the day.

A fifth filter finds commits of code moved from one version-controlled repository to another not on the same date. It is a case similar to the one above where we gave the example of moving a source code library from a repository where it is used to a separate repository only for libraries. Then there will be two commits with the same counts of symbols added and deleted—one for removing the code from the current repository and one for adding it to the new repository. This time, however, the first commit happened on one date and the second commit on a later date.

A sixth filter finds commits, which are outliers using the established Statistical process control (SPC) method of Exponentially Weighted Moving Average (EWMA) Control Charts. The EWMA Control Charts is a statistic for monitoring a business or industrial process's entire history of output. Such EWMA chart averages the process data in a way that gives less and less weight to data as it is further remote in time from the current measurement. In one embodiment, the process outputs are the added and deleted symbols for the software developer on a daily basis for the entire history of contributions to the version-controlled repository. The filter keeps only the commits, which are part of a stable knowledge discovery process.

After applying all the filters described above, the Templates and Fraud Detection Engine 180 gathers a list of all commits for the current software developer, which can be considered either templates or fraud. The Templates and Fraud Detection Engine 180 stores detected templates and fraudulent values in table Template 530. The format of the data stored in table Template 530 can be: 1) commit hash, which is the unique identifier generated by Git®; 2) number of symbols added; 3) number of symbols deleted; 4) timestamp of the commit; and 5) author name of the commit. Other options are possible.

Turning again to FIG. 1, the KEDE Calculation Engine 140 uses the date stored in the collection of Templates and Fraudulent commits 130 along with the data stored in the collection of knowledge worker profiles 150 to generate one or more KEDE values 120 that capture the KEDE characteristics of knowledge worker entities.

The KEDE Calculation Engine 140 receives a specification of a principle of aggregation defining the way to calculate KEDE for individual knowledge workers of a knowledge worker entity.

In terms of time, a particular principles of aggregation, which is also referred to as "time aggregation type" includes: 1) aggregating on a daily basis to produce models for Daily KEDE; 2) aggregating on weekly basis to produce models for Weekly KEDE; 3) aggregating on monthly basis to produced models for Monthly KEDE; 4) aggregating on a quarterly basis to produce models for Quarterly KEDE.

In terms of the knowledge worker entity, a particular principles of aggregation for aggregating KEDE values can include: (i) aggregating unique individual knowledge workers (creating KEDE models for each individual); (ii) aggregating into teams (to create KEDE models for teams of individual knowledge workers specific in an organization); (iii) aggregating into projects (to create KEDE models for whole projects); and (iv) aggregating into companies (to create KEDE models for whole companies).

In some implementations, the Static analysis system 102 allows end users to specify any arbitrary aggregation for defining the knowledge worker entities. Thus, an end user could specify that knowledge workers should be aggregated by geographic regions, undergraduate university, or, in the context of software development, by the computer language used.

In one embodiment, the KEDE Calculation Engine 140 is implemented for the case when the knowledge worker entity is one or more software developers. The Text files repositories 155 are implemented using Git® and they contain computer software source code.

The KEDE Calculation Engine 140 receives a request to calculate KEDE for a software developer. The request specifies the project and time aggregation principle—daily or weekly. Monthly and quarterly KEDE can also be calculated but will not be de described here for the sake of brevity.

From table Commit 570 (FIG. 5) the KEDE Calculation Engine 140 loads the symbol contributions for the software developer to all the repositories that are assigned to the project. From table Template 530 the KEDE Calculation Engine 140 loads the commits with symbol contributions, which are considered either templates or fraud, because they are not to be used in the KEDE calculations.

The KEDE Calculation Engine 140 calculates KEDE for the software developer and specified time aggregation.

When the calculation is finished, the KEDE Calculation Engine 140 stores the calculated Daily KEDE in table Daily KEDE 550 and Weekly KEDE in table Weekly KEDE 560.

In case of table Daily KEDE 550 the format of the is: 1) author name of the commit; 2) date of the commit; 3) unique identifier of the repository; 4) number of symbols added; 5) number of symbols deleted; 6) number of net symbols added; 7) Daily KEDE value; 8) average daily cumulative growth rate; and 8) average daily waste (W). In case of table Weekly KEDE 560 the format of the data is: 1) author name of the commit; 2) date of Monday for the week of the commit; 3) unique identifier of the repository; 4) total number of symbols added for the week of the commit date; 5) total number of symbols deleted for the week of the commit date; 6) total number of net symbols added for the week of the commit date; 7) Weekly KEDE value; 8) average weekly cumulative growth rate for the week of the commit date; and 9) average weekly waste for the week of the commit date (W).

Turning back to FIG. 1, the Modeling engine 115 utilizes KEDE values 120 for a target knowledge worker entity and uses one or more of a variety of techniques to generate KEDE models and compute values of KEDE attributes for the target knowledge worker entity.

The Modeling engine 115 receives a definition of a target knowledge worker entity and principle of aggregation. The target knowledge worker entity is the knowledge worker entity whose KEDE is being analyzed. As described above, the target knowledge worker entity can be a single knowledge worker or any appropriate grouping of knowledge workers to be analyzed, e.g., teams, knowledge workers on a project, knowledge workers at a company, etc.

The Modeling engine 115 extracts KEDE values 120 for the knowledge workers within the defined knowledge worker entity and aggregates the KEDE values of the target knowledge worker entity. Because the basis for the KEDE data is activities by individual knowledge workers, the Modeling engine 115 gathers the KEDE values 120 for individual knowledge workers first, and then aggregates the values depending on a principle of aggregation for the target knowledge worker entity. If the target knowledge worker entity is a team, the Modeling engine 115 aggregates KEDE values 120 by members of the team. If the target knowledge worker entity is a project, the Modeling engine 115 aggregates KEDE values 120 for commits to all repositories that belong to the project. If the target knowledge worker entity is a whole company, the Modeling engine 115 can aggregate KEDE values 120 for commits to all repositories that belong to the company. In one example, if a company has 20 knowledge workers that contribute to two projects, the Modeling engine 115 can first extract KEDE values 120 for the individual knowledge workers for all the projects that they work on and then aggregate the values by classifying the values as belonging to the target knowledge worker entity or not.

While the Modeling engine 115 can combine the KEDE values 120 for individual knowledge workers, for example for commits by the same knowledge worker that occurred on the same day, the Modeling engine 115 generally does not combine KEDE values 120 for larger knowledge worker entities. The reason for this is that KEDE is intended to quantify the knowledge discovery efficiency of knowledge worker entities rather than simply their size. For example, if individual KEDE values 120 are combined in this way, a team of 100 unskilled knowledge workers could easily generate a higher KEDE than a team of 5 highly skilled knowledge workers, which would be a result that is not useful. The Modeling engine 115 generates KEDE models using the aggregated KEDE of the knowledge worker entity. Then the Modeling engine 115 computes values for one or more KEDE attributes using the KEDE models for the target knowledge worker entity. The Modeling engine 115 computes the values for the KEDE attributes from the KEDE models in a number of ways depending on the computational resources available and depending on how important it is to control for sampling error in the collected data. The Modeling engine 115 therefore supports trade-off decisions between the model cost, for example time to construct, and model accuracy, for example the ability to accurately predict values of KEDE attributes on missing data.

For example, the Modeling engine 115 can compute values for the KEDE attributes relatively cheaply by simply computing statistics from the KEDE values 120 themselves. In a sense, this is a model-free approach. The representative KEDE is then a mean or a median of the KEDE values 120. The Modeling engine 115 can also compute credibility intervals from quantile ranges of the KEDE values 120. However, this relatively cheap technique is not as accurate as other techniques.

The Modeling engine 115 can alternatively compute values for the KEDE attributes by fitting a pre-selected model type, for example an exponential distribution, to the KEDE values 120 that maximize an objective function, for example maximum likelihood. This technique is referred to as a model fitting approach. The representative KEDE is then the mean or median of the fitted distribution, and the Modeling engine 115 can compute the credibility intervals from probability ranges of the model itself. Fitting a pre-selected model to the data introduces some bias and therefore reduces sensitivity to sampling error.

The Modeling engine 115 can introduce further bias by making use of existing knowledge regarding the typical or expected KEDE models expected to be encountered based on prior data analysis. In this way, the computation discounts belief in models that confound the bias, unless there is strong empirical evidence in favor of the model. For example, in using a Bayesian approach, the engine can generate a posterior distribution that defines probability over the parameter space of all possible models of the preselected type. The Modeling engine 115 generates the posterior distribution from both the collected KEDE values 120 (the empirical evidence) and the bias computed from KEDE values 120 collected from prior data.

After generating the KEDE model for the target knowledge worker entity, the Modeling engine 115 can use the model to compute values for a variety of KEDE attributes of the target knowledge worker entity. For example, the Modeling engine 115 can use the model to compute a probability that the target knowledge worker entity will have a particular KEDE. In yet another example, the Modeling engine 115 can use the model to compute a most likely representative KEDE value for the target knowledge worker entity. In addition, the Modeling engine 115 can use the model to compute credibility intervals that indicate for a particular knowledge worker entity a minimum and a maximum KEDE between which a particular percentage of KEDE values will lie with a particular measure of certainty.

Users of the Modeling engine 115 can also use KEDE models of target knowledge worker entities to improve project progress tracking activities. Traditionally, knowledge workers estimate the amount of time required to deliver a new feature for a project by estimating two things: (1) a guess as to the lines of code required to implement the request, and (2) a guess as to the working time required to deliver the estimated lines of code. Then, a model is made as to the lines of code to be produced per working day. The tracking of progress compares the planned daily rate to the actual daily rate.

KEDE provides an alternative method for tracking progress. In this approach, the manager tracks if an actual KEDE value for the target knowledge worker entity that works on the project equals the historical KEDE values for a prior knowledge worker entity that worked successfully on a similar project.

Referring again to FIG. 1, a user of the User device 160 can submit a request for a presentation of KEDE information to the Static analysis system 102 over the Network 170. The Network 170 can be any appropriate data communications network, for example one that includes an intranet, the Internet, or some combination of these.

The Presentation engine 110 receives the request and uses the Modeling engine 115 to satisfy the request. The request itself can specify a subset of knowledge workers for which KEDE data is to be presented.

The Presentation engine 110 can use the Modeling engine 115 to compute values for a variety of different KEDE attributes. For example, the Presentation engine 110 can obtain: (i) a representative KEDE for a given knowledge worker entity, (ii) a KEDE range for a given knowledge worker entity for a given credibility, e.g., 80% probability, and (iii) a representative KEDE produced by a given knowledge worker entity, e.g., for a given time period, and for a given reference population of knowledge workers.

In another example, the Presentation engine 110 can generate other types of information, for example a histogram as described below with reference to FIG. 9.

The Presentation engine 110 then generates a user interface presentation, which is provided back to the User device 160 over the network 170. The user interface presentation can be in different formats, for example in a graphical format (PNG, JPG), in JSON format or as hypertext markup language (HTML) or Extensible Markup Language (XML) document for display by a web browser. Some implementations include an application for the User device 160 that implements a user interface and can display, in a text or graphical form, data received from the presentation engine 110.

In one embodiment, the Static analysis system 102 of FIG. 1 performs ranking of knowledge worker entities using a KEDE model. The Static analysis system 102 receives a request to rank knowledge worker entities using KEDE models. For example, the request is sent by a user of User device 160 over the Network 170. The request can specify a subset of knowledge worker entities who have contributed to repositories analyzed by the Static analysis system 102 and for which the Static analysis system 102 has calculated KEDE values. For example, the request can be a request to rank knowledge workers of a particular team of knowledge workers within an organization, a request to rank multiple teams of knowledge workers, a request to rank all knowledge workers within an organization, a request to rank multiple projects, a request to rank multiple organizations, a request to rank all knowledge workers who have contributed to a repository, or a request to rank all knowledge workers who have contributed any textual content to any of the repositories.

The Static analysis system 102 obtains a KEDE model for each knowledge worker entity specified by the request. For example, the Static analysis system 102 can obtain a previously computed KEDE model or compute one as described above. The Static analysis system 102 ranks the knowledge worker entities using the respective KEDE models and provides a presentation of the ranking. There are a variety of ways the Static analysis system 102 can rank knowledge worker entities using a KEDE model and a variety of different user interface presentations for presenting the ranking.

In general, the Static analysis system 102 can rank knowledge worker entities relative to one another by projecting data of the KEDE models into a one-dimensional space and ranking the knowledge worker entities according to where they fall in that one-dimensional space.

One technique for ranking knowledge worker entities using the KEDE model is to compute a representative KEDE point estimate from the KEDE model for the knowledge worker entity. The Static analysis system 102 can compute the KEDE point estimate as any appropriate representative value for the KEDE. In some implementations, the Static analysis system 102 computes the KEDE point estimate as a value that maximizes a particular utility function. For example, the median of the KEDE model maximizes a linear utility function. The Static analysis system 102 can also use other representative KEDE point estimates using the mean or mode of the KEDE model. In some embodiments, the median has advantages over the mean. In particular, the median can better represent a right-skewed distribution compared to the mean.

To use the median for the KEDE point estimate, the Static analysis system 102 computes a value $\pi_i$ such that: $P(Y_i \geq \pi_i) = P(Y_i \leq \pi_i)$.

The Static analysis system 102 can then rank all knowledge worker entities specified by the request according to the KEDE point estimates.

KEDE point estimates discard all the distributional data of the KEDE model. Thus, to give a more complete picture within a user interface presentation, the Static analysis system 102 can also compute and present credibility intervals, which are also referred to as KEDE ranges. A KEDE range defines a range of values within which the predictions are expected to fall for a given probability.

The Static analysis system 102 can also rank knowledge worker entities by relative KEDE. A ranking by relative KEDE compares a particular knowledge worker entity's KEDE model to that of a reference knowledge worker entity, which could be thought of as an "average" knowledge worker entity.

Figure 2:
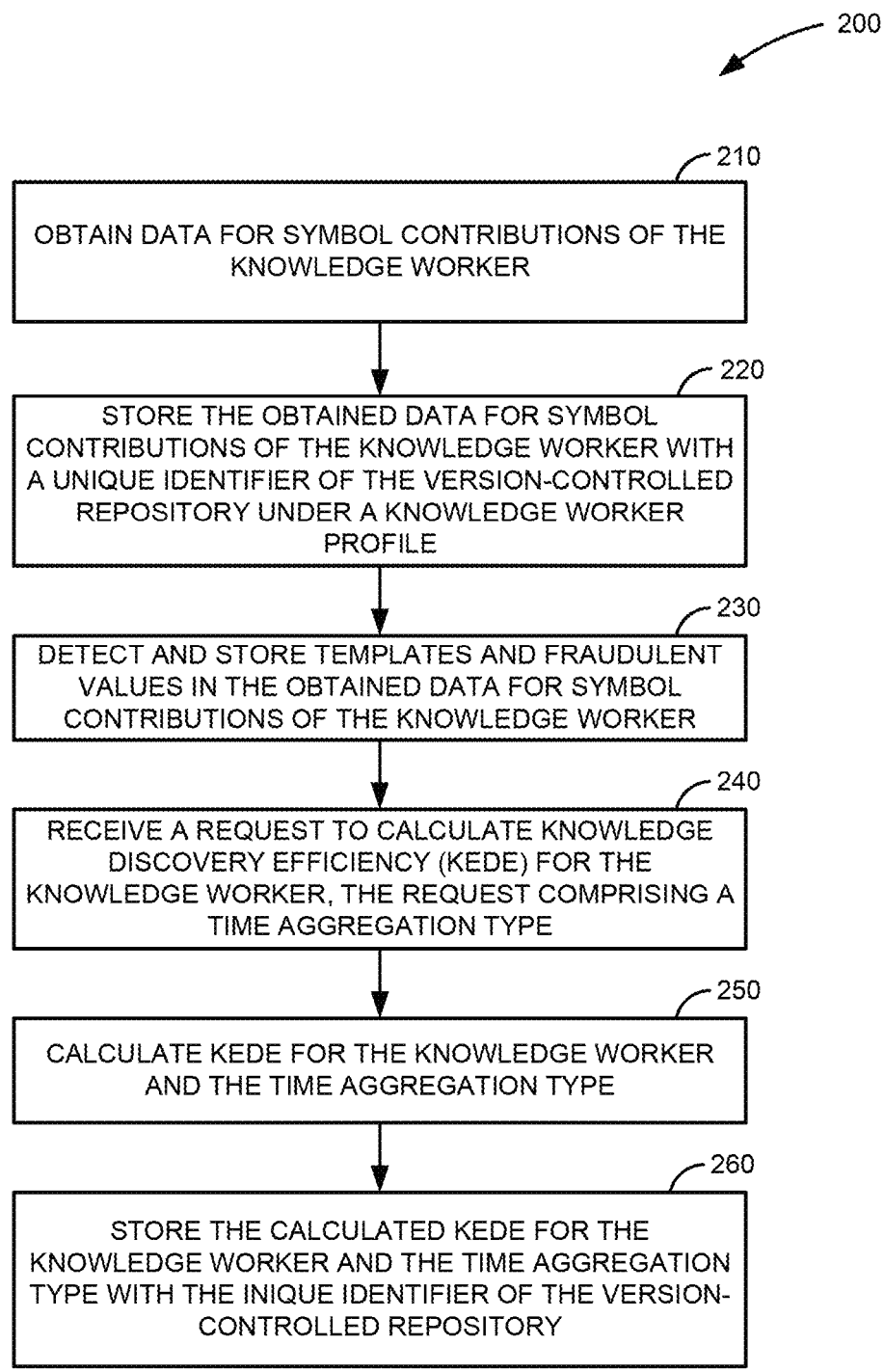
FIG. 2 is a flow diagram of a method for generating efficiency metrics for a knowledge worker.

FIG. 2 is a flow diagram of a method 200 for generating efficiency metrics for a knowledge worker. At 210, data for symbol contributions of the knowledge worker is obtained. The symbol contributions are occurring in commits by the knowledge worker to files in a version-controlled repository. For example, the version-controlled repository is implemented, such as the Text files repositories 155. The symbol contributions are, for example, symbols added to and deleted from the files in the version-controlled repository.

In one embodiment, the knowledge worker is a software developer. In this embodiment, obtaining the data for symbol contributions of the software developer includes the steps as presented in FIG. 3. At 310, a request to analyze a local clone of the version-controlled repository is received. The request includes the name of a project the analyzed version-controlled repository is to be assigned to, and a repository path leading to a directory where the analyzed repository is cloned. At 320, a list of commits from the local clone is extracted. At 330, author name and creation time for the list of commits is extracted. At 340, data representing one or more parent commits from the list of commits and one or more child commits from the list of commits is extracted. Each of the one or more parent commits is a parent commit to a child commit in a revision graph of the version-controlled repository, and each commit includes source code of the one or more files of the version-controlled repository as the one or more files existed at a particular point in time. At 350, for each pair of parent-child commits a diffing method is performed, which produces one or more patches. A diffing method outputs the set of differences between two inputs, wherein here the inputs are parent-child commits. A patch contains changes from an old state to a new state of a file from the one or more files of the version-controlled repository. At 360, added and deleted symbols for each of the one or more patches are counted. At 370, the computer language used for each of the one or more patches is detected. At 380, counts of added and deleted symbols for the list of commits are stored. For example, they are stored in table Commit 570 (FIG. 5). At 390, counts of symbols per detected computer language for the list of commits are stored. For example, the symbols per detected computer language are stored in table Language 540 (FIG. 5).

Referring again to FIG. 2, at 220, the obtained data for symbol contributions of the knowledge worker is stored together with a unique identifier of the version-controlled repository under a knowledge worker profile.

Figure 3:
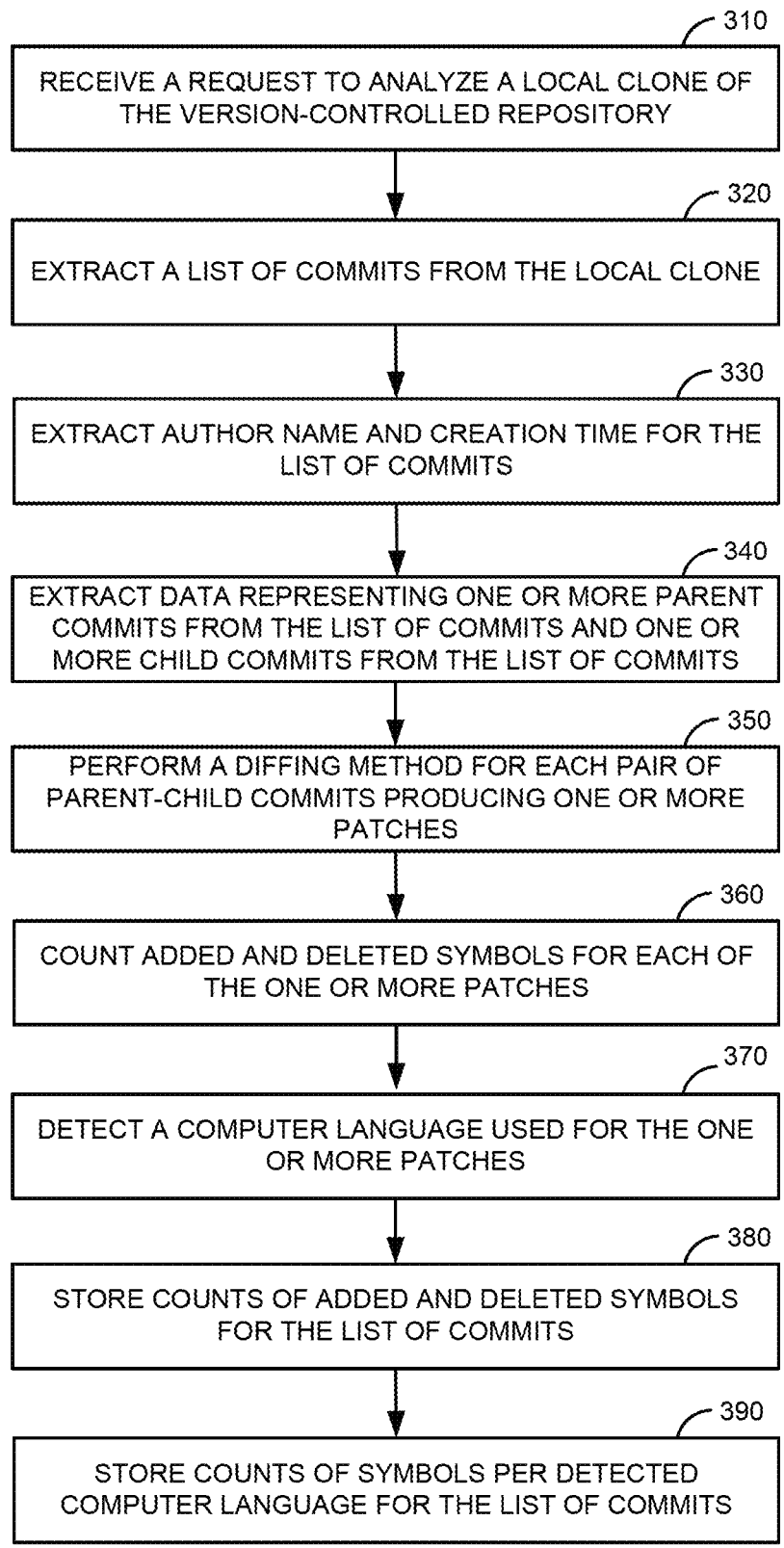
FIG. 3 is a flow diagram of a method for obtaining data for symbol contributions of a knowledge worker.

In one implementation, steps 210 and 220, and all the steps in relation to FIG. 3, are performed by an analysis and attribution engine of a computer system for generating efficiency metrics of a knowledge worker. For example, these steps are performed by the Analysis and attribution engine 190 of FIG. 1.

Referring back to FIG. 2, at 230, templates and fraudulent values in the obtained data for symbol contributions of the knowledge worker are detected and stored. In one embodiment, the knowledge worker is a software developer. In this embodiment, detecting and storing templates and fraudulent values in the obtained data for symbol contributions of the knowledge worker includes the steps as presented in FIG. 4. At 410, a request is received to find templates and fraudulent values for the software developer. At 420, obtained data for symbol contributions per commit for the software developer is loaded. At 430, commits of same code in different version-controlled repositories for the software developer at the same time are found. At 440, commits for the software developer that have same commit identifier are found. Commits with same identifier appear in case that an existing clone is copied to a new directory under a new name. At 450, commits are found with a total count of symbols changed exceeding the estimated maximum amount of symbol contributions that can be contributed for the time period indicated by the time aggregation type. At 460, commits of code moved from one version-controlled repository to another on the same date are found. At 470, commits of code moved from one version-controlled repository to another not on the same date are found. At 480, commits are found, which are outliers using the method of Exponentially Weighted Moving Average Control Charts. At 490, detected templates and fraudulent values for one or more found commits are stored. For example, the detected templates and fraudulent value are stored in table Template 530 (FIG. 5).

Figure 4:
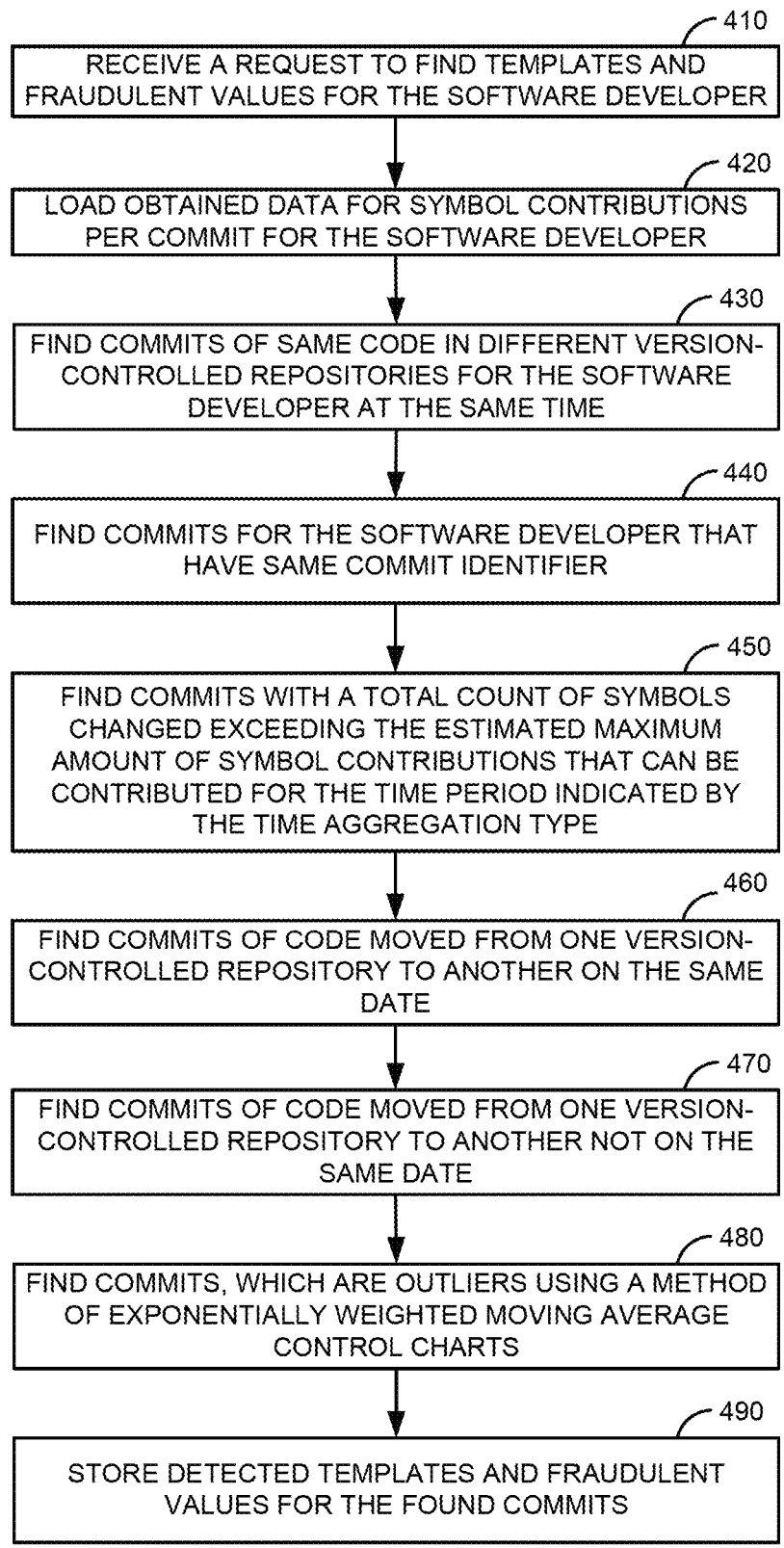
FIG. 4 is a flow diagram of a method for detecting and storing templates and fraudulent values in data for symbol contributions of a knowledge worker.

In one implementation, step 230 and all the steps in relation to FIG. 4 are performed by a templates and fraud detection engine of a computer system for generating efficiency metrics of a knowledge worker. For example, these steps are performed by the Templates and fraud detection engine 180 of FIG. 1.

Referring back to FIG. 2, at 240, a request is received to calculate knowledge discovery efficiency (KEDE) for the knowledge worker. The request includes a time aggregation type.

At 250, KEDE is calculated for the knowledge worker and the time aggregation type. KEDE is a ratio between the symbol contributions of the knowledge worker for a time period indicated by the time aggregation type, and a predetermined constant representing the estimated maximum amount of symbol contributions that can be contributed for the time period indicated by the time aggregation type. The templates and fraudulent values are excluded from the symbol contributions of the knowledge worker for the time period indicated by the time aggregation type.

At 260, the calculated KEDE for the knowledge worker and the time aggregation type is stored, together with the unique identifier of the version-controlled repository.

In one implementation, steps 240, 250, and 260 are performed by a calculation engine of a computer system for generating efficiency metrics of a knowledge worker. For example, these steps are performed by the KEDE calculation engine 140 of FIG. 1.

Figure 6:
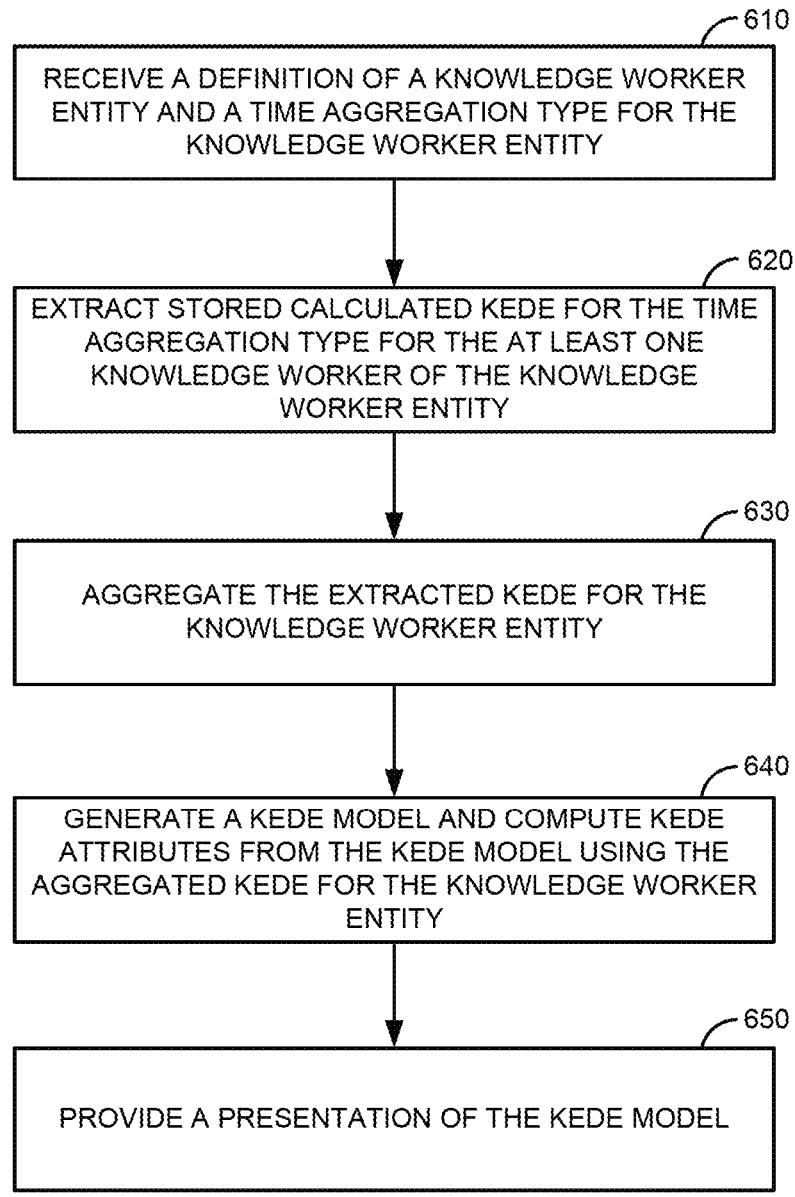
FIG. 6 is flow diagram of a method for generating KEDE models for knowledge workers.

FIG. 6 is flow diagram of a method for generating KEDE models for knowledge workers. At 610, a definition of a knowledge worker entity and a time aggregation type for the knowledge worker entity is received. The knowledge worker entity includes at least one knowledge worker. At 620, stored calculated KEDE for the time aggregation type for the at least one knowledge worker of the knowledge worker entity is extracted. The extracted KEDE for the at least one knowledge worker and the time aggregation type is previously calculated and stored, for example, as described in steps 250 and 260 of FIG. 2. At 630, the extracted KEDE for the knowledge worker entity is aggregated. At 640 a KEDE model is generated and KEDE attributes are computed from the KEDE model using the aggregated KEDE for the knowledge worker entity. In different embodiments, the KEDE attributes are, for example, an average, a median, a confidence interval, and a percentile. At 650, a presentation of the KEDE model is provided.

In one implementation, steps 610, 620, 630, and 640 are performed by a modeling engine, and step 650 by a presentation engine of a computer system for generating efficiency metrics of a knowledge worker. For example, these steps are performed by the Modeling engine 115 and the Presentation engine 110 of FIG. 1.

Figure 7:
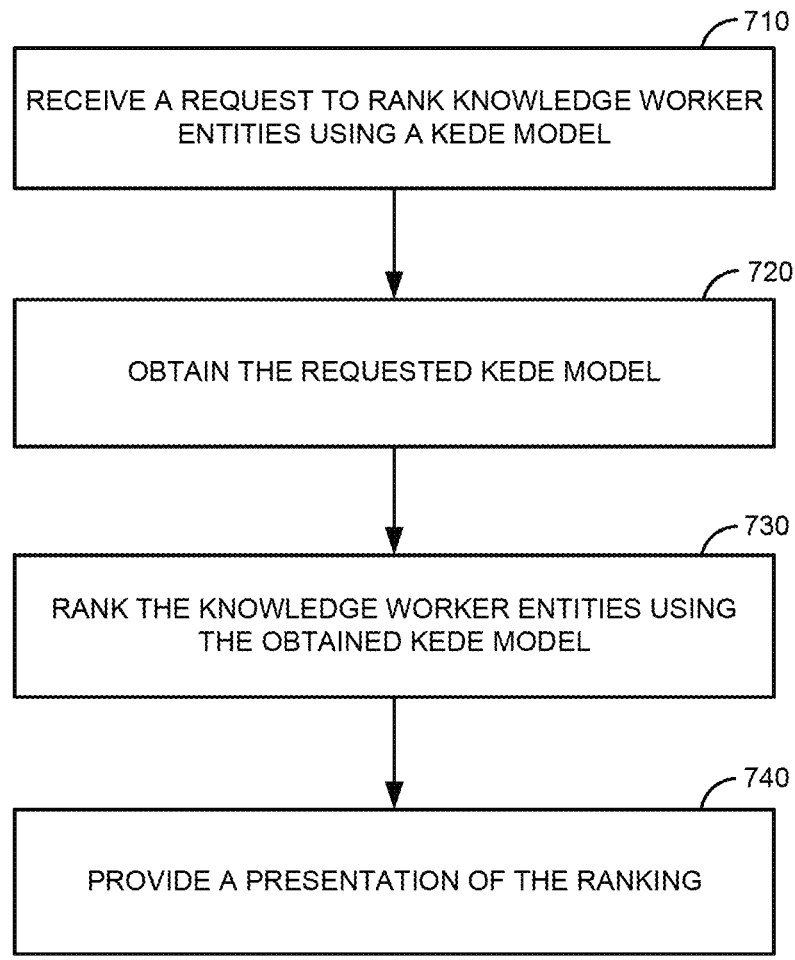
FIG. 7 is a flow diagram of a method for ranking knowledge worker entities.

FIG. 7 is a flow diagram of a method for ranking knowledge worker entities. At 710, a request is received to rank knowledge worker entities using a KEDE model. At 720, the requested KEDE model is obtained. At 730, the knowledge worker entities are ranked using the obtained KEDE model. At 740, a presentation of the ranking is provided.

In one implementation, steps 710, 720, and 730 are performed by a modeling engine, and step 740 by a presentation engine of a computer system for generating efficiency metrics of a knowledge worker. For example, these steps are performed by the Modeling engine 115 and the Presentation engine 110 of FIG. 1.

Figure 8:
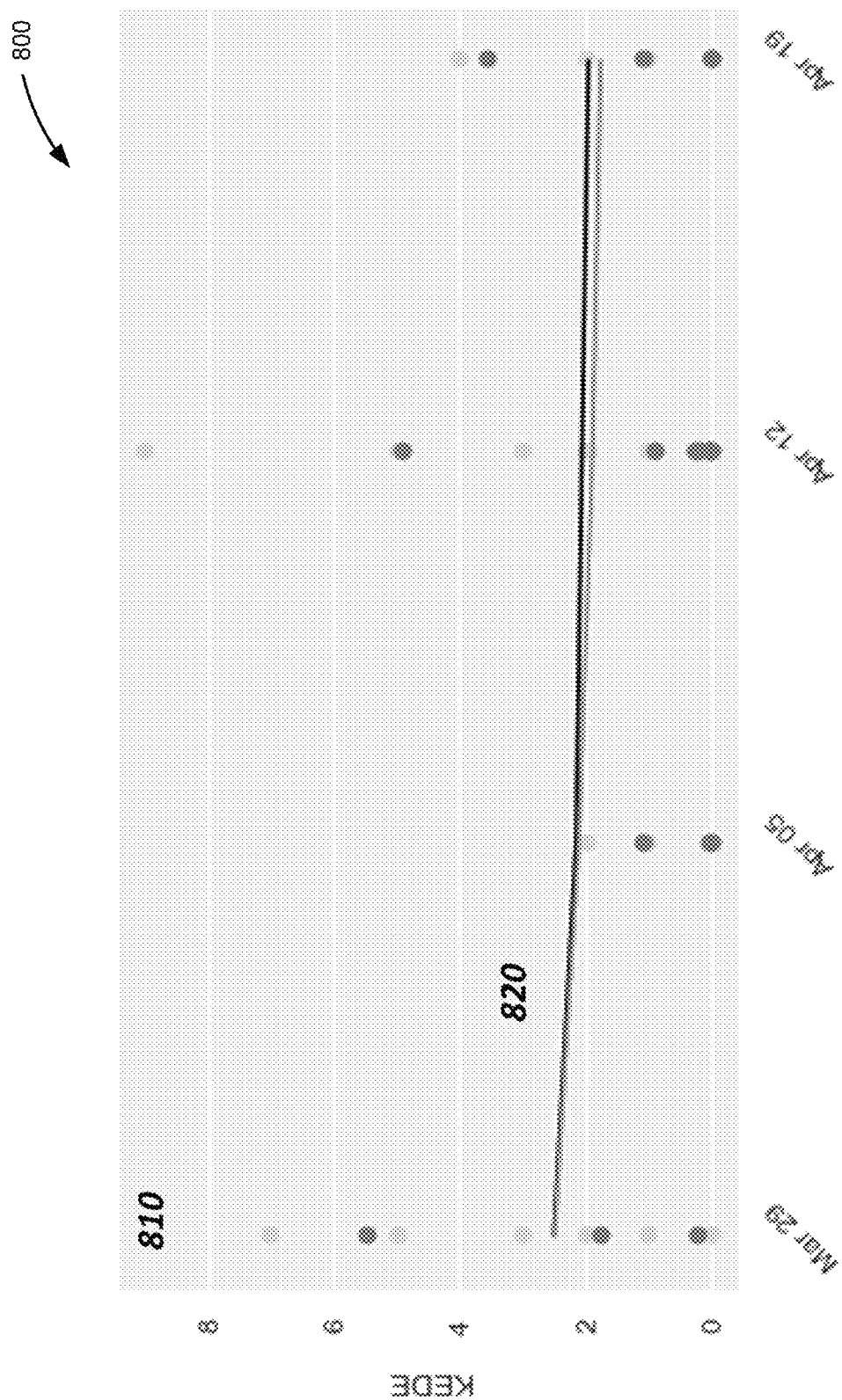
FIG. 8 illustrates an example KEDE time-series presentation.

FIG. 8 illustrates an example KEDE time-series presentation 800. The presentation 800 includes a plot 810 that shows a sequence of KEDE values taken at successive equally spaced points in time during a specified time period for a particular knowledge worker entity. In this example, the knowledge worker entity is a team of software developers who are assigned to a particular project.

On the x-axis are the week dates. On the y-axis are weekly KEDE. Each dot is the weekly KEDE of one knowledge worker summed up only over the repositories the selected project is linked with. Hence, what is shown is only the fraction contributed to the selected project knowledge worker's overall weekly performance. That is needed because a knowledge worker could work for more than one project during one and the same week.

The trend line 820 illustrates how the KEDE for the knowledge worker entity has changed over time. The average values can be calculated by EWMA.

To compute the data needed for the presentation 800, the KEDE calculation engine 140 can define the principle of aggregation for the target knowledge worker entity to be all knowledge workers assigned to the particular project for the time period. The KEDE calculation engine 140 can then request the Modeling engine 115 to compute a KEDE time-series for the knowledge worker entity using only knowledge workers who are assigned to the project during that time period. The Modeling engine 115 can then compute a representative KEDE for the knowledge worker.

This information is far more informative for gauging the intensity of work effort devoted to the project than other metrics, for example simply counting the number of developers on the project or the number of commits. These other metrics fail to take into account the actual contribution in terms of knowledge discovered that the knowledge workers on the project had during each of the time periods defined.

Knowledge workers and their managers can use such presentation to gain valuable insights into the history of the work effort in a project over time.

Figure 9:
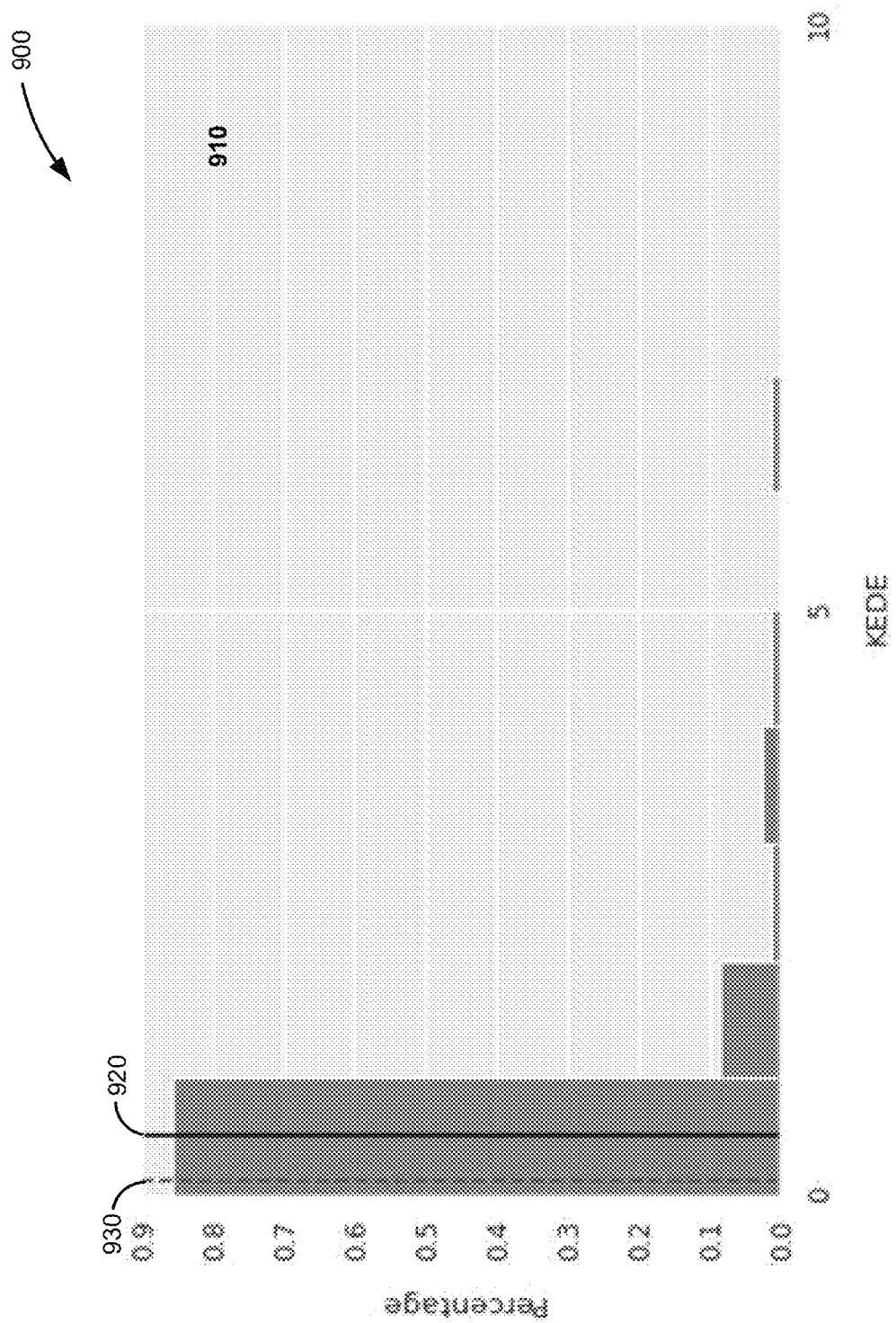
FIG. 9 illustrates an example KEDE histogram.

FIG. 9 illustrates an example KEDE histogram. Presentation 900 includes a plot 910 that shows a histogram of weekly KEDE for a selected time period for a particular knowledge worker entity. In this example, the knowledge worker entity is one or more software developers who are assigned to a particular project.

On the x-axis are the weekly KEDE. On the y-axis is the percentage of each particular value. The histogram presents weekly KEDE summed up only over the repositories the selected project is linked with. Hence, what is shown is only the fraction contributed to the selected project knowledge worker's overall weekly performance. That is needed because a knowledge worker could work for more than one project during the same week. The average value 920 can be calculated by arithmetic mean. The median value 930 can be calculated as the 50th percentile.

To acquire the data needed for the presentation 900, the KEDE calculation engine 140 can define the principle of aggregation for the target knowledge worker entity to be all knowledge workers assigned to the particular project for the time period. The KEDE calculation engine 140 can then request the Modeling engine 115 to compute a KEDE histogram for the knowledge worker entity using only knowledge workers who are assigned to the project during that time period. The Modeling engine 115 can then compute a representative KEDE for the knowledge worker entity.

Figure 10:
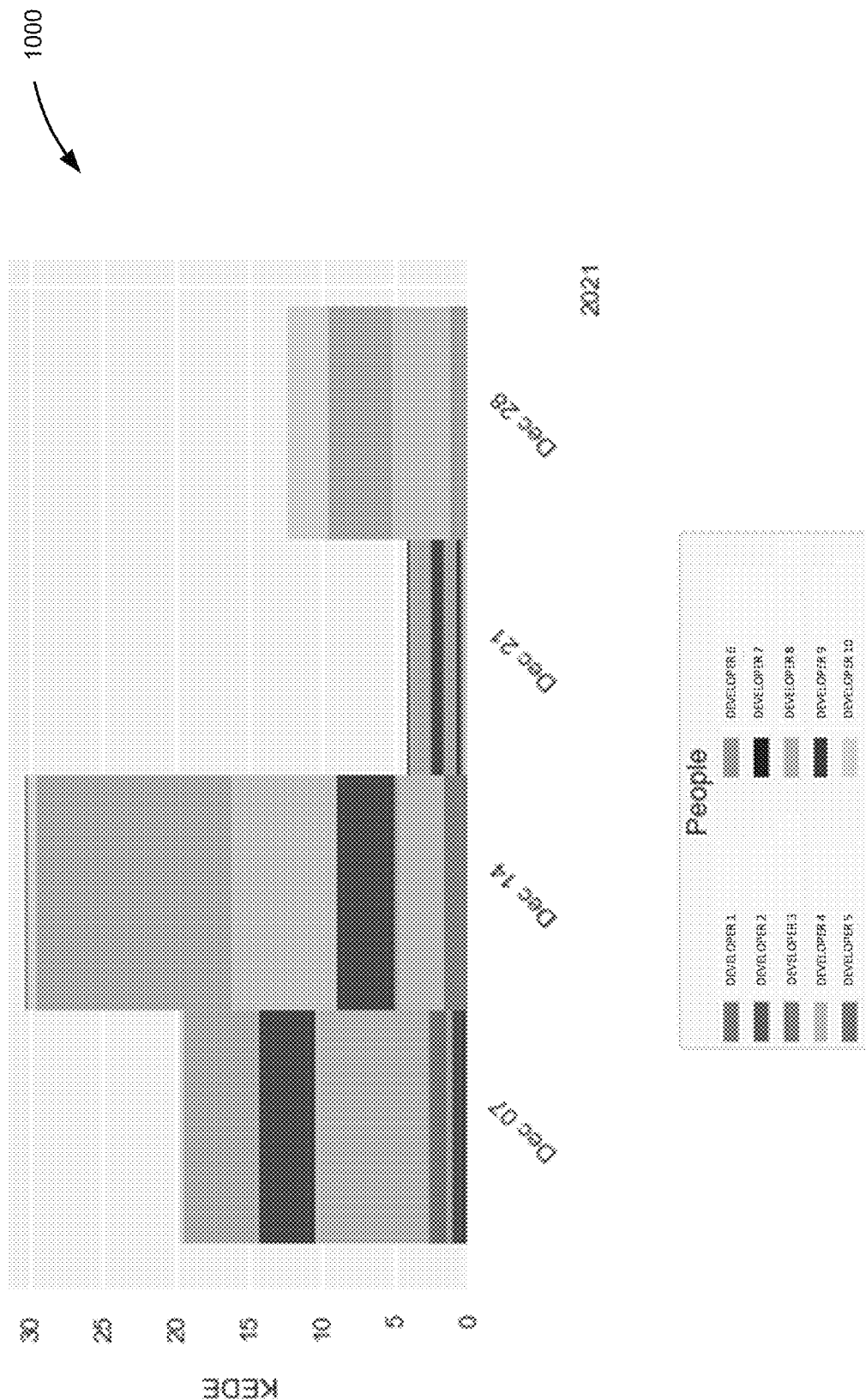
FIG. 10 illustrates an example KEDE stacked bar chart that presents KEDE per knowledge worker entity for a project.

FIG. 10 illustrates an example KEDE stacked bar chart 1000 that presents KEDE per knowledge worker entity for a project. In this example, the knowledge worker entity is one or more software developers who worked on a particular project. Individual KEDE values are added up to show the total KEDE per day in a project.

This chart is useful for the project managers to compare KEDE share amongst software developers on the same project.

Figure 11:
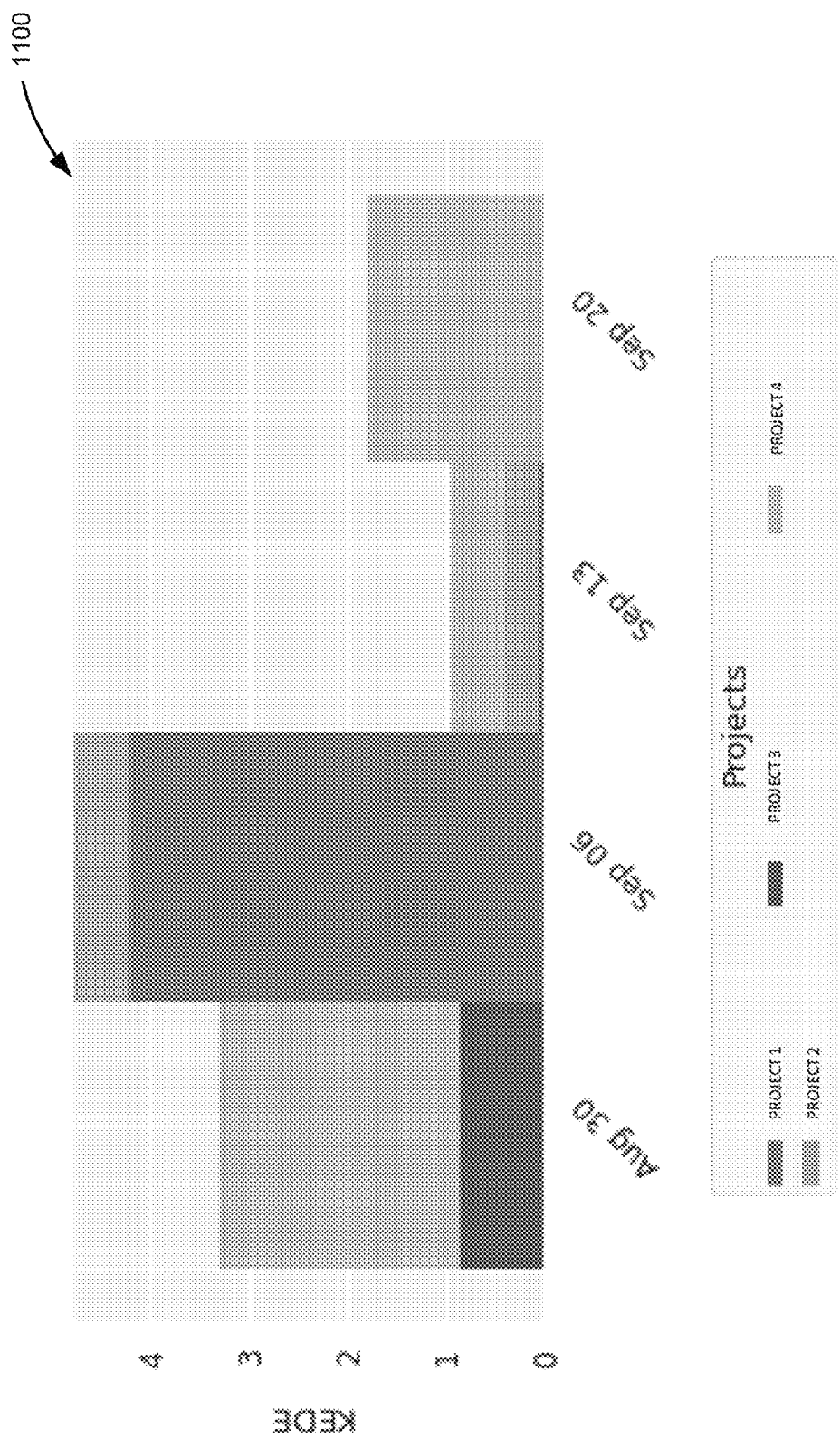
FIG. 11 illustrates an example KEDE stacked bar chart that presents KEDE for a knowledge worker entity across projects.

The chart 1000 presents a stacked bar chart, which allows for looking at numeric values across two categorical variables. Here, the first category is a project and the second category is the weekly KEDE for all software developers who worked on the project during the selected time period. On the x-axis are the week dates. On the y-axis is weekly KEDE. Each bar is the weekly KEDE of the selected project divided into a number of boxes each one corresponding to the fraction of the weekly KEDE, which each of the software developers contributed to the project. The legend lists generated names of all software developers who contributed to the project FIG. 11 illustrates an example KEDE stacked bar chart 1100 that presents KEDE for a knowledge worker entity across projects. In this example, the knowledge worker entity is a single software developer, who was assigned to one or more projects.

Such a chart is needed, for example, because one software developer could contribute to more than one project. For a project manager it is useful to see how the total daily KEDE for a software developer is distributed among many projects.

The chart 1100 presents a stacked bar chart, which allows for looking at numeric values across two categorical variables. Here, the first category is the software developer's weekly KEDE and the second category is the projects the same software developer worked on during the selected time period. On the x-axis are the week dates. On the y-axis is weekly KEDE. Each bar is the weekly KEDE of the selected software developer divided into a number of boxes each one corresponding to the fraction of the weekly KEDE that the software developer contributed for a particular project. The legend lists generated example names of all the projects the software developer contributed to.

Figure 12:
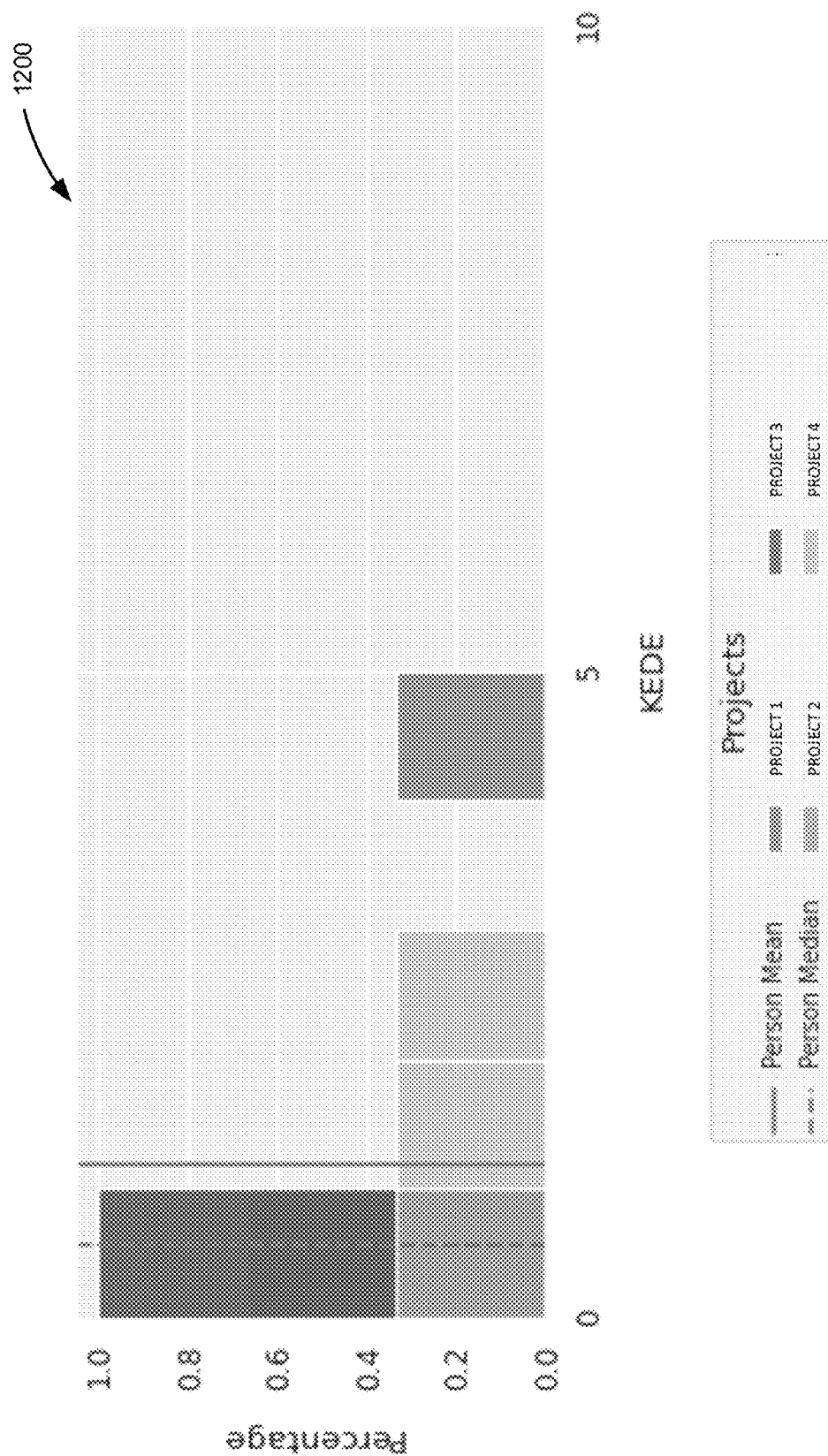
FIG. 12 illustrates an example KEDE histogram that presents Weekly KEDE for a knowledge worker entity across projects.

FIG. 12 illustrates an example KEDE histogram 1200 that presents Weekly KEDE for a knowledge worker entity across projects. In this example, the knowledge worker entity is a single software developer, who contributed to one or more projects.

On the x-axis of the histogram 1200 are the weekly KEDE. On the y-axis is the percentage of each particular value.

On this single histogram, what is shown is a histogram for each of the projects the software developer contributed to during the selected time period. Each project has assigned a different shade of grey.

Histograms present weekly KEDE summed up only over the repositories the selected project is linked with. Hence, only the fraction of the software developer's weekly performance contributed to each of the projects is shown. The legend lists generated example names of all the projects the software developer contributed to, the average and median values for all the projects. The average value can be calculated by arithmetic mean. The median value can be calculated as the 50th percentile.

Figure 13:
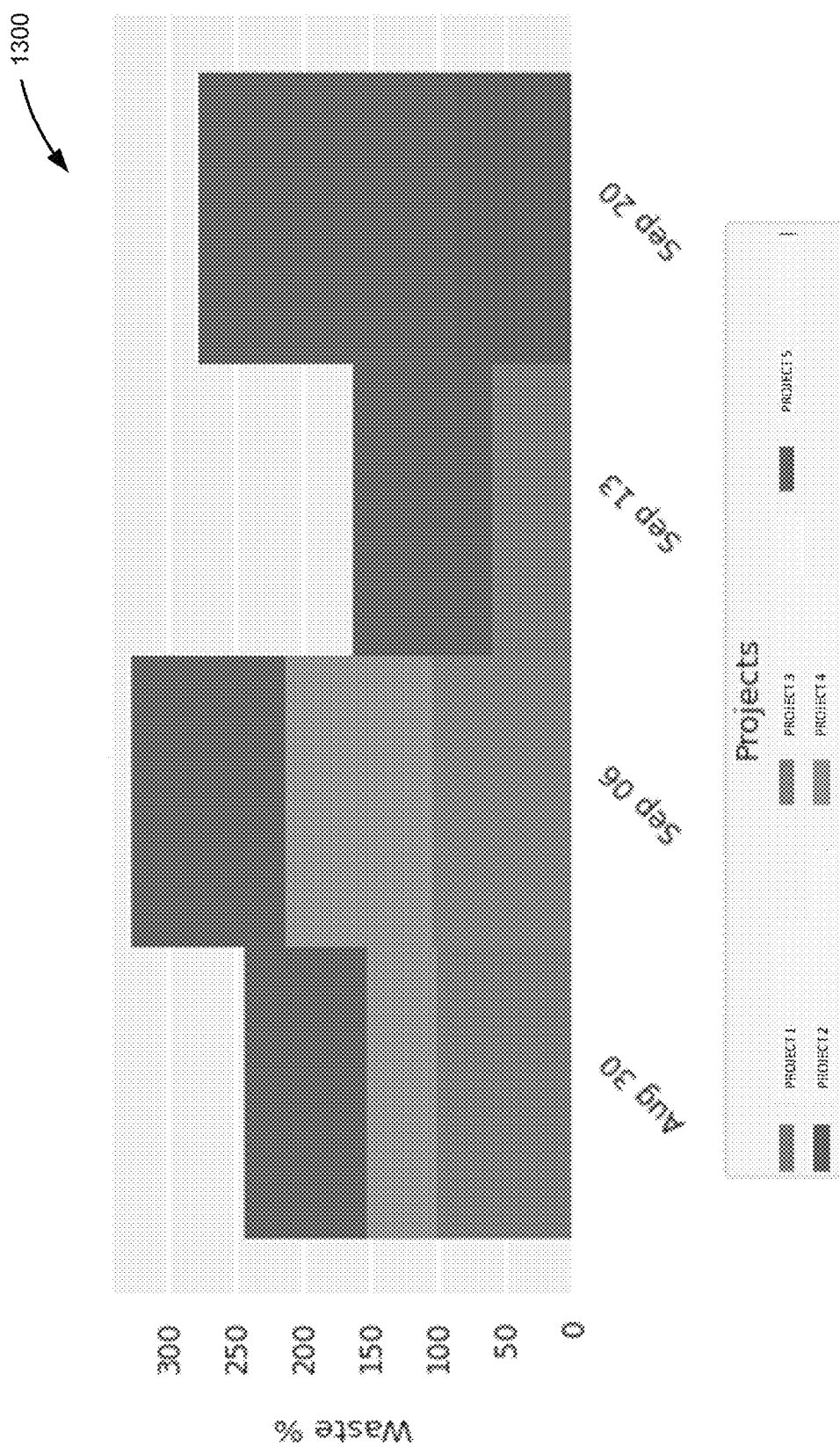
FIG. 13 illustrates an example KEDE stacked bar chart that presents Waste (W) for a knowledge worker entity across projects.

FIG. 13 illustrates an example KEDE stacked bar chart 1300 that presents Waste (W) for a knowledge worker entity across projects. In this example, the knowledge worker entity is a single software developer, who was assigned to one or more projects.

Waste represents things that should not have been done, but nevertheless were. As presented above, Waste (W) is a percentage between deleted and added symbols of one software developer per period of time.

Such a chart 1300 is needed, for example, because one software developer could contribute to more than one project. For a project manager it is useful to see how much waste a software developer produced across many projects.

The stacked bar chart 1300 of FIG. 13 allows for looking at numeric values across two categorical variables. Here the first category is software developer's weekly W and the second category is the projects the same software developer worked on during the selected time period. On the x-axis are the week dates. On the y-axis is weekly W.

Each bar is the weekly W of the selected software developer divided into a number of boxes, each one corresponding to the fraction of the weekly W that the software developer produced for a particular project.

The legend lists generated example names of all the projects the software developer contributed to.

Figure 14:
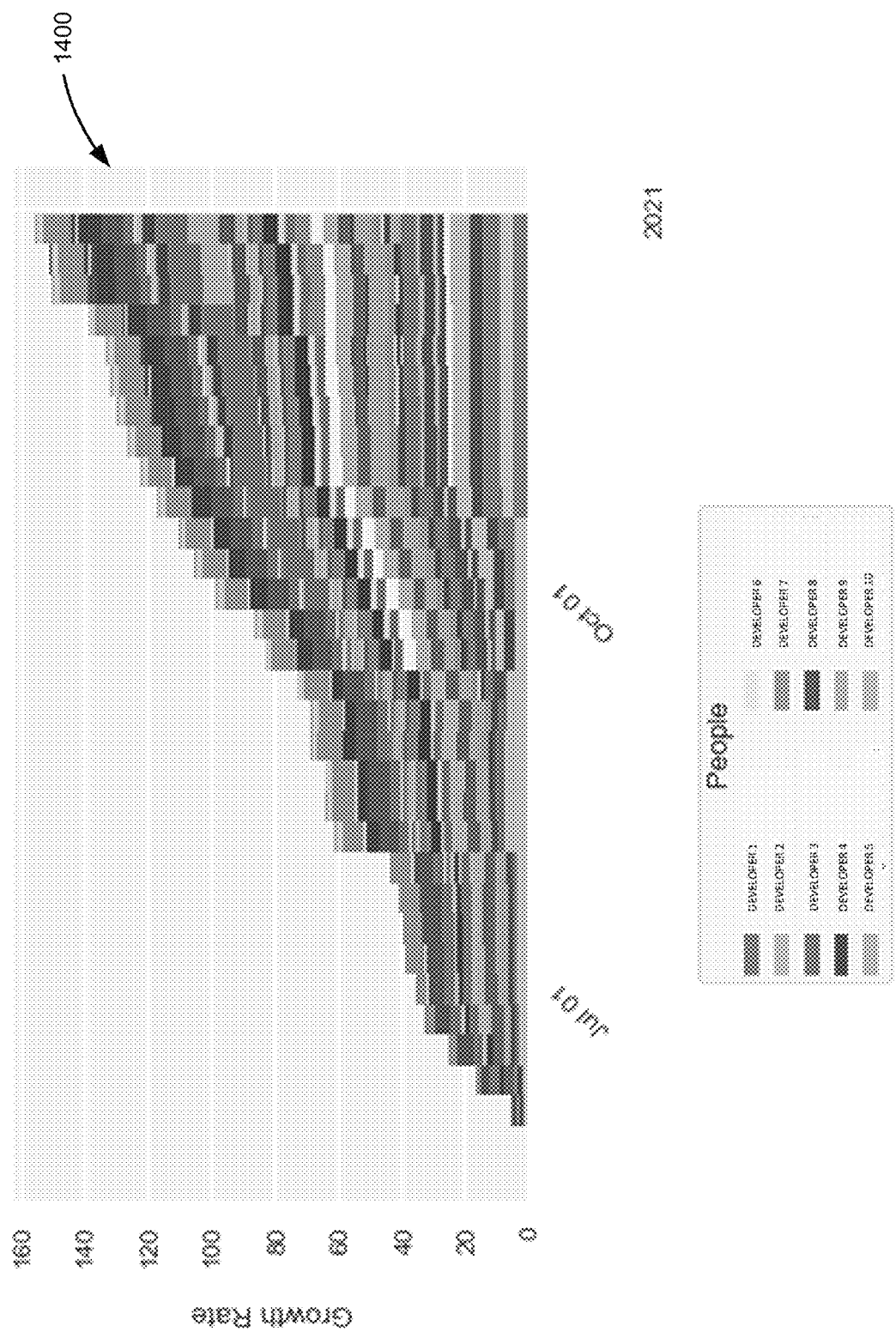
FIG. 14 illustrates an example knowledge discovery cumulative growth diagram that presents the weekly knowledge discovery cumulative growth rate for a knowledge worker entity that contributed to a project.

FIG. 14 illustrates an example KEDE cumulative growth diagram 1400 that presents the weekly cumulative growth rate for a knowledge worker entity that contributed to a project. In this example, the knowledge worker entity is one or more software developers who worked on a particular project.

Cumulative growth here is a percentage of increase of net added symbols over a period of time.

On the x-axis are the week dates. On the y-axis is cumulative growth rate in log scale. The legend lists example names of all software developers who contributed to the project.

Each bar has stacked the exponential cumulative growth rate of each of the software developers for the respective week. In summary, the total growth rate for the selected project and time period can be seen.

Some embodiments of the invention can include the above-described methods being written as one or more software components. These components, and the functionality associated with each, can be used by client, server, distributed, or peer computer systems. These components can be written in a computer language corresponding to one or more programming languages such as, functional, declarative, procedural, object-oriented, lower level languages and the like. They can be linked to other components via various application programming interfaces and then compiled into one complete application for a server or a client. Alternatively, the components can be implemented in server and client applications. Further, these components can be linked together via various distributed programming protocols. Some example embodiments of the invention can include remote procedure calls being used to implement one or more of these components across a distributed programming environment. For example, a logic level can reside on a first computer system that is remotely located from a second computer system containing an interface level (e.g., a graphical user interface). These first and second computer systems can be configured in a server-client, peer-to-peer, or some other configuration. The clients can vary in complexity, from mobile and handheld devices to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention can be implemented using Java, C++, or other object-oriented programming language and development tools. Another embodiment of the invention can be implemented in hard-wired circuitry in place of, or in combination with machine readable software instructions.

Figure 15:
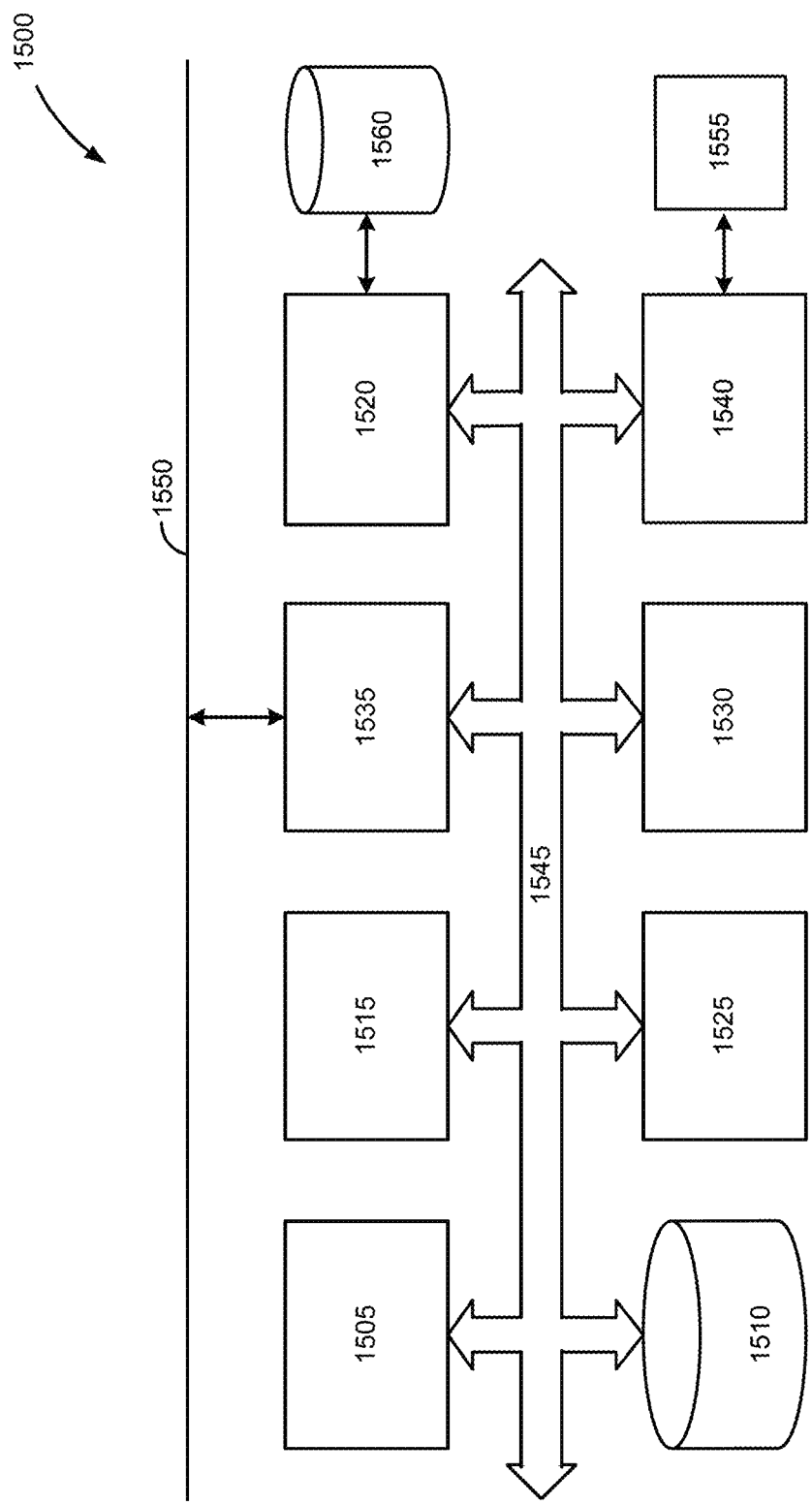
FIG. 15 is a block diagram of an exemplary computer system suitable for implementing the present invention.

FIG. 15 is a block diagram of an exemplary computer system 1500 suitable for implementing the present invention. The computer system 1500 includes a processor 1505 that executes software instructions or code stored on a computer readable storage medium 1555 to perform the above-illustrated methods of the invention. The computer system 1500 includes a media reader 1540 to read the instructions from the computer readable storage medium 1555 and store the instructions in storage 1510 or in random access memory (RAM) 1515. The storage 1510 provides a large space for keeping static data where at least some instructions could be stored for later execution. The stored instructions can be further compiled to generate other representations of the instructions and dynamically stored in the RAM 1515. The processor 1505 reads instructions from the RAM 1515 and performs actions as instructed. According to one embodiment of the invention, the computer system 1500 further includes an output device 1525 to provide at least some of the results of the execution as output including, but not limited to, visual information to users, and an input device 1530 to provide a user or another device with means for entering data and/or otherwise interact with the computer system 1500. Each of these output devices 1525 and input devices 1530 could be joined by one or more additional peripherals to further expand the capabilities of the computer system 1500. A network communicator 1535 can be provided to connect the computer system 1500 to a network 1550 and in turn to other devices connected to the network 1550 including other clients, servers, data stores, and interfaces, for instance. The modules of the computer system 1500 are interconnected via a bus 1545. Computer system 1500 includes a data source interface 1520 to access data source 1560. The data source 1560 can be accessed via one or more abstraction layers implemented in hardware or software. For example, the data source 1560 can be accessed by network 1550.

The invention claimed is:

1. A computer-implemented method for generating efficiency metrics for a knowledge worker using a computer system including a processor and a database, the method comprising:
   obtaining from a directory where a version-controlled repository with a unique identifier is cloned over a data communications network data for symbol contributions of the knowledge worker, the symbol contributions occurring in commits by the knowledge worker to one or more files in the version-controlled repository, wherein the symbol contributions are symbols added to and deleted from the one or more files and the version-controlled repository is a data structure that stores metadata for a set of files;
   storing in a table of the database of the computer system the obtained data for the symbol contributions of the knowledge worker with the unique identifier of the version-controlled repository under a knowledge worker profile;
   detecting and storing in the table of the database of the computer system templates and fraudulent values in the obtained data for the symbol contributions of the knowledge worker;
   receiving at the processor of the computer system a request over the data communications network to calculate knowledge discovery efficiency (KEDE) for the knowledge worker, wherein the request includes the unique identifier of the version-controlled repository and a time aggregation type;
   calculating KEDE for the knowledge worker and the time aggregation type, wherein KEDE is a ratio between the symbol contributions of the knowledge worker for a time period indicated by the time aggregation type, excluding the templates and fraudulent values, and a predetermined constant representing an estimated maximum amount of the symbol contributions that can be contributed for the time period indicated by the time aggregation type; and
   presenting over the data communication network the calculated KEDE to a user on a user device, wherein the user device includes a user interface and a display.

2. The method of claim 1, wherein the knowledge worker is a software developer.

3. The method of claim 2, wherein obtaining the data for symbol contributions of the knowledge worker comprises:
   receiving a request to analyze a local clone of the version-controlled repository, wherein the request comprises a name of a project the analyzed version-controlled repository to be assigned to, and a repository path leading to a directory where the analyzed repository is cloned;
   extracting a list of commits from the local clone;
   extracting author name and creation time for the list of commits;
   extracting data representing one or more parent commits from the list of commits;
   and one or more child commits from the list of commits, wherein each of the one or more parent commits is a parent commit to a child commit in a revision graph of the version-controlled repository, and wherein each commit includes source code of the one or more files of the version-controlled repository as the one or more files existed at a particular point in time;
   for each pair of parent-child commits performing a diffing method producing one or more patches, wherein a patch from the one or more patches contains changes from an old state to a new state of a file from the one or more files of the version-controlled repository;
counting added and deleted symbols for each of the one or more patches;
detecting a computer language used for each of the one or more patches;
storing counts of added and deleted symbols for the list of commits; and
storing counts of symbols per detected computer language for the list of commits.

4. The method of claim 3, wherein detecting and storing templates and fraudulent values in the obtained data for symbol contributions of the knowledge worker further comprises:
receiving a request to find templates and fraudulent values for the software developer;
loading the obtained data for symbol contributions per commit for the software developer;
finding commits of same code in different version-controlled repositories for the software developer at the same time;
finding commits for the software developer that have same commit identifier, wherein commits with same identifier appear in case that an existing repository is copied to a new directory under a new name;
finding commits with a total count of symbols changed exceeding the estimated maximum amount of symbol contributions that can be contributed for the time period indicated by the time aggregation type;
finding commits of code moved from one version-controlled repository to another on the same date;
finding commits of code moved from one version-controlled repository to another not on the same date;
finding commits, which are outliers using a method of Exponentially Weighted Moving Average Control Charts; and
storing the detected templates and fraudulent values for the found commits.

5. The method of claim 4, further comprising:
receiving a definition of a knowledge worker entity and a time aggregation type for the knowledge worker entity, wherein the knowledge worker entity comprises at least one knowledge worker;
extracting stored calculated KEDE for the time aggregation type for the at least one knowledge worker of the knowledge worker entity;
aggregating the extracted KEDE for the knowledge worker entity;
generating a KEDE model and computing KEDE attributes from the KEDE model using the aggregated KEDE for the knowledge worker entity; and
providing a presentation of the KEDE model.

6. The method of claim 5, further comprising:
receiving a request to rank knowledge worker entities using the KEDE model;
obtaining the KEDE model based on the request;
ranking the knowledge worker entities using the obtained KEDE model; and
providing a presentation of the ranking.

7. The method of claim 3, further comprising:
receiving a definition of a knowledge worker entity and a time aggregation type for the knowledge worker entity, wherein the knowledge worker entity comprises at least one knowledge worker;
extracting stored calculated KEDE for the time aggregation type for the at least one knowledge worker of the knowledge worker entity;
aggregating the extracted KEDE for the knowledge worker entity;
generating a KEDE model and computing KEDE attributes from the KEDE model using the aggregated KEDE for the knowledge worker entity; and
providing a presentation of the KEDE model.

8. The method of claim 2, wherein detecting and storing templates and fraudulent values in the obtained data for symbol contributions of the knowledge worker further comprises:
receiving a request to find the templates and fraudulent values for the software developer;
loading the obtained data for symbol contributions per commit for the software developer;
finding commits of same code in different version-controlled repositories for the software developer at the same time;
finding commits for the software developer that have same commit identifier, wherein commits with same identifier appear in case that an existing repository is copied to a new directory under a new name;
finding commits with a total count of symbols changed exceeding the estimated maximum amount of symbol contributions that can be contributed for the time period indicated by the time aggregation type;
finding commits of code moved from one version-controlled repository to another on the same date;
finding commits of code moved from one version-controlled repository to another not on the same date;
finding commits, which are outliers using a method of Exponentially Weighted Moving Average Control Charts; and
storing the detected templates and fraudulent values for the found commits.

9. The method of claim 8, further comprising:
receiving a definition of a knowledge worker entity and a time aggregation type for the knowledge worker entity, wherein the knowledge worker entity comprises at least one knowledge worker;
extracting stored calculated KEDE for the time aggregation type for the at least one knowledge worker of the knowledge worker entity;
aggregating the extracted KEDE for the knowledge worker entity;
generating a KEDE model and computing KEDE attributes from the KEDE model using the aggregated KEDE for the knowledge worker entity; and
providing a presentation of the KEDE model.

10. The method of claim 2 further comprising:
receiving a definition of a knowledge worker entity and a time aggregation type for the knowledge worker entity, wherein the knowledge worker entity comprises at least one knowledge worker;
extracting stored calculated KEDE for the time aggregation type for the at least one knowledge worker of the knowledge worker entity;
aggregating the extracted KEDE for the knowledge worker entity;
generating a KEDE model and computing KEDE attributes from the KEDE model using the aggregated KEDE for the knowledge worker entity; and
providing a presentation of the KEDE model.

11. The method of claim 10 further comprising:
receiving a request to rank knowledge worker entities using the KEDE model;

obtaining the KEDE model based on the request;
ranking the knowledge worker entities using the obtained KEDE model; and
providing a presentation of the ranking.

12. A computer system for generating efficiency metrics for a knowledge worker comprising:
   a directory where a version-controlled repository with a unique identifier is cloned over a data communications network;
   a database including one or more tables;
   an analysis and attribution engine arranged to:
      obtain data for symbol contributions of the knowledge worker, the symbol contributions occurring in commits by the knowledge worker to one or more files in the version-controlled repository, wherein the symbol contributions are symbols added to and deleted from the one or more files, wherein the version-controlled repository is a data structure that stores metadata for a set of files; and
      store the obtained data for the symbol contributions of the knowledge worker with the unique identifier of the version-controlled repository under a knowledge worker profile;
   a templates and fraud detection engine arranged to detect and store templates and fraudulent values in the obtained data for the symbol contributions of the knowledge worker; and
   a KEDE calculation engine arranged to:
      receive at a processor of the computer system a request over a data communications network to calculate knowledge discovery efficiency (KEDE) for the knowledge worker, wherein the request includes the unique identifier of the version-controlled repository and a time aggregation type; and
      calculate KEDE for the knowledge worker and the time aggregation type and present over the data communication network to a user the calculated KEDE, wherein KEDE is a ratio between the symbol contributions of the knowledge worker for a time period indicated by the time aggregation type, excluding the templates and fraudulent values, and a predetermined constant representing an estimated maximum amount of the symbol contributions that can be contributed for the time period indicated by the time aggregation type.

13. The system of claim 12, wherein the knowledge worker is a software developer.

14. The system of claim 13, wherein the analysis and attribution engine is further arranged to:
   receive a request to analyze a local clone of the version-controlled repository, wherein the request comprises a name of a project the analyzed version-controlled repository to be assigned to, and a repository path leading to a directory where the analyzed repository is cloned;
   extract a list of commits from the local clone;
   extract author name and creation time for the list of commits;
   extract data representing one or more parent commits from the list of commits and one or more child commits from the list of commits, wherein each of the one or more parent commits is a parent commit to a child commit in a revision graph of the version-controlled repository, and wherein each commit includes source code of the one or more files of the version-controlled repository as the one or more files existed at a particular point in time;
   for each pair of parent-child commits perform a diffing method producing one or more patches, wherein a patch from the one or more patches contains changes from an old state to a new state of a file from the one or more files of the version-controlled repository;
   count added and deleted symbols for each of the one or more patches;
   detect a computer language used for each of the one or more patches;
   store counts of added and deleted symbols for the list of commits; and
   store counts of symbols per detected computer language for the list of commits.

15. The system of claim 14, further comprising:
   a modeling engine arranged to:
      receive a definition of a knowledge worker entity and a time aggregation type for the knowledge worker entity, wherein the knowledge worker entity comprises at least one knowledge worker;
      extract stored calculated KEDE for the time aggregation type for the at least one knowledge worker of the knowledge worker entity;
      aggregate the extracted KEDE for the knowledge worker entity; and
      generate a KEDE model and compute KEDE attributes from the KEDE model using the aggregated KEDE for the knowledge worker entity; and
   a presentation engine arranged to provide a presentation of the KEDE model.

16. The system of claim 15, wherein:
   the modeling engine is further arranged to:
      receive a request to rank knowledge worker entities using the KEDE model;
      obtain the KEDE model based on the request; and
      rank the knowledge worker entities using the obtained KEDE model; and
   the presentation engine is further arranged to provide a presentation of the ranking.

17. The system of claim 14, wherein the templates and fraud detection engine is further arranged to:
   receive a request to find templates and fraudulent values for the software developer;
   load the obtained data for symbol contributions per commit for the software developer;
   find commits of same code in different version-controlled repositories for the software developer at the same time;
   find commits for the software developer that have same commit identifier, wherein commits with same identifier appear in case that an existing repository is copied to a new directory under a new name;
   find commits with a total count of symbols changed exceeding the estimated maximum amount of symbol contributions that can be contributed for the time period indicated by the time aggregation type;
   find commits of code moved from one version-controlled repository to another on the same date;
   find commits of code moved from one version-controlled repository to another not on the same date;
   find commits, which are outliers using a method of Exponentially Weighted Moving Average Control Charts; and
   store the detected templates and fraudulent values for the found commits.

18. The system of claim 17, further comprising:
a modeling engine arranged to:
receive a definition of a knowledge worker entity and a time aggregation type for the knowledge worker entity, wherein the knowledge worker entity comprises at least one knowledge worker;
extract stored calculated KEDE for the time aggregation type for the at least one knowledge worker of the knowledge worker entity;
aggregate the extracted KEDE for the knowledge worker entity; and
generate a KEDE model and compute KEDE attributes from the KEDE model using the aggregated KEDE for the knowledge worker entity; and
a presentation engine arranged to provide a presentation of the KEDE model.

19. The system of claim 18, wherein:
the modeling engine is further arranged to:
receive a request to rank knowledge worker entities using the KEDE model;
obtain the requested KEDE model; and
rank the knowledge worker entities using the obtained KEDE model; and
the presentation engine is further arranged to provide a presentation of the ranking.

20. The system of claim 13, wherein the templates and fraud detection engine is further arranged to:
receive a request to find templates and fraudulent values for the software developer;
load the obtained data for symbol contributions per commit for the software developer;
find commits of same code in different version-controlled repositories for the software developer at the same time;
find commits for the software developer that have same commit identifier, wherein commits with same identifier appear in case that an existing repository is copied to a new directory under a new name;
find commits with a total count of symbols changed exceeding the estimated maximum amount of symbol contributions that can be contributed for the time period indicated by the time aggregation type;
find commits of code moved from one version-controlled repository to another on the same date;
find commits of code moved from one version-controlled repository to another not on the same date;
find commits, which are outliers using a method of Exponentially Weighted Moving Average Control Charts; and
store the detected templates and fraudulent values for the found commits.

21. The system of claim 20, further comprising:
a modeling engine arranged to:
receive a definition of a knowledge worker entity and a time aggregation type for the knowledge worker entity, wherein the knowledge worker entity comprises at least one knowledge worker;
extract stored calculated KEDE for the time aggregation type for the at least one knowledge worker of the knowledge worker entity;
aggregate the extracted KEDE for the knowledge worker entity; and
generate a KEDE model and compute KEDE attributes from the KEDE model using the aggregated KEDE for the knowledge worker entity; and
a presentation engine arranged to provide a presentation of the KEDE model.

22. The system of claim 21, wherein:
the modeling engine is further arranged to:
receive a request to rank knowledge worker entities using the KEDE model;
obtain the requested KEDE model; and
rank the knowledge worker entities using the obtained KEDE model; and
the presentation engine is further arranged to provide a presentation of the ranking.

23. The system of claim 13 further comprising:
a modeling engine arranged to:
receive a definition of a knowledge worker entity and a time aggregation type for the knowledge worker entity, wherein the knowledge worker entity comprises at least one knowledge worker;
extract stored calculated KEDE for the time aggregation type for the at least one knowledge worker of the knowledge worker entity;
aggregate the extracted KEDE for the knowledge worker entity; and
generate a KEDE model and compute KEDE attributes from the KEDE model using the aggregated KEDE for the knowledge worker entity; and
a presentation engine arranged to provide a presentation of the KEDE model.

24. The system of claim 23, wherein:
the modeling engine is further arranged to:
receive a request to rank knowledge worker entities using the KEDE model;
obtain the requested KEDE model; and
rank the knowledge worker entities using the obtained KEDE model; and
the presentation engine is further arranged to provide a presentation of the ranking.

25. A computer program product comprising a non-transitory computer readable storage medium loaded with computer readable instructions, which, when loaded and executed on a computer system perform the steps of a method comprising:
obtaining from a directory where a version-controlled repository with a unique identifier is cloned over a data communications network data for symbol contributions of a knowledge worker, the symbol contributions occurring in commits by the knowledge worker to one or more files in a version-controlled repository, wherein the symbol contributions are symbols added to and deleted from the one or more files, wherein the version-controlled repository is a data structure that stores metadata for a set of files;
storing in a table of the database of the computer system the obtained data for the symbol contributions of the knowledge worker with a unique identifier of the version-controlled repository under a knowledge worker profile;
detecting and storing templates and fraudulent values in the obtained data for the symbol contributions of the knowledge worker;
receiving over a data communications network a request to calculate knowledge discovery efficiency (KEDE) for the knowledge worker, wherein the request includes the unique identifier of the version-controlled repository and a time aggregation type; and
calculating KEDE for the knowledge worker and the time aggregation type and presenting over the data communication network to a user the calculated KEDE, wherein KEDE is a ratio between the symbol contributions of the knowledge worker for a time period indicated by the time aggregation type, excluding the templates and fraudulent values, and a predetermined constant representing an estimated maximum amount of the symbol contributions that can be contributed for the time period indicated by the time aggregation type.

26. The computer program product of claim 25, wherein the knowledge worker is a software developer.

27. The computer program product of claim 26, wherein obtaining the data for symbol contributions of the knowledge worker comprises:
   receiving a request to analyze a local clone of the version-controlled repository, wherein the request comprises a name of a project the analyzed version-controlled repository to be assigned to, and a repository path leading to a directory where the analyzed repository is cloned;
   extracting a list of commits from the local clone;
   extracting author name and creation time for the list of commits;
   extracting data representing one or more parent commits from the list of commits and one or more child commits from the list of commits, wherein each of the one or more parent commits is a parent commit to a child commit in a revision graph of the version-controlled repository, and wherein each commit includes source code of the one or more files of the version-controlled repository as the one or more files existed at a particular point in time;
   for each pair of parent-child commits performing a diffing method producing one or more patches, wherein a patch from the one or more patches contains changes from an old state to a new state of a file from the one or more files of the version-controlled repository;
   counting added and deleted symbols for each of the one or more patches;
   detecting a computer language used for each of the one or more patches;
   storing counts of added and deleted symbols for the list of commits; and
   storing counts of symbols per detected computer language for the list of commits.

28. The computer program product of claim 27, wherein detecting and storing templates and fraudulent values in the obtained data for symbol contributions of the knowledge worker further comprises:
   receiving a request to find templates and fraudulent values for the software developer;
   loading the obtained data for symbol contributions per commit for the software developer;
   finding commits of same code in different version-controlled repositories for the software developer at the same time;
   finding commits for the software developer that have same commit identifier, wherein commits with same identifier appear in case that an existing repository is copied to a new directory under a new name;
   finding commits with a total count of symbols changed exceeding the estimated maximum amount of symbol contributions that can be contributed for the time period indicated by the time aggregation type;
   finding commits of code moved from one version-controlled repository to another on the same date;
   finding commits of code moved from one version-controlled repository to another not on the same date;
   finding commits, which are outliers using a method of Exponentially Weighted Moving Average Control Charts; and
   storing the detected templates and fraudulent values for the found commits.

29. The computer program product of claim 28, further comprising instructions, which, when loaded and executed on a suitable system perform the steps of a method comprising:
   receiving a definition of a knowledge worker entity and a time aggregation type for the knowledge worker entity, wherein the knowledge worker entity comprises at least one knowledge worker;
   extracting stored calculated KEDE for the time aggregation type for the at least one knowledge worker of the knowledge worker entity;
   aggregating the extracted KEDE for the knowledge worker entity;
   generating a KEDE model and computing KEDE attributes from the KEDE model using the aggregated KEDE for the knowledge worker entity; and
   providing a presentation of the KEDE model.

30. The computer program product of claim 29, further comprising instructions, which, when loaded and executed on a suitable system perform the steps of a method comprising:
   receiving a request to rank knowledge worker entities using the KEDE model;
   obtaining the KEDE model based on the request;
   ranking the knowledge worker entities using the obtained KEDE model; and
   providing a presentation of the ranking.

* * * * *